(12) United States Patent
Mochizuki et al.

(10) Patent No.: US 6,940,246 B2
(45) Date of Patent: Sep. 6, 2005

(54) POWER-WINDOW JAMMING PREVENTING APPARATUS

(75) Inventors: Yasuyuki Mochizuki, Haibara-gun (JP); Yuichi Nakazawa, Haibara-gun (JP); Susumu Yamamoto, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/933,359

(22) Filed: Sep. 3, 2004

(65) Prior Publication Data

US 2005/0083003 A1 Apr. 21, 2005

(30) Foreign Application Priority Data

Sep. 4, 2003 (JP) ................................ P.2003-312588

(51) Int. Cl.[7] .............................................. H02P 3/00
(52) U.S. Cl. .................... 318/469; 318/434; 318/280; 318/283; 318/466; 49/26; 49/28
(58) Field of Search ............................... 318/280–283, 318/286, 432, 434, 466, 468, 469; 49/26, 28

(56) References Cited

U.S. PATENT DOCUMENTS

| 5,559,375 A | * | 9/1996 | Jo et al. .................... 307/10.1 |
| 5,729,104 A | * | 3/1998 | Kamishima et al. ........ 318/446 |
| 5,734,245 A | * | 3/1998 | Terashima et al. .......... 318/453 |
| 5,977,732 A | * | 11/1999 | Matsumoto .................. 318/283 |
| 6,051,945 A | * | 4/2000 | Furukawa .................... 318/280 |
| 6,359,408 B1 | * | 3/2002 | Tyckowski ................... 318/469 |
| 6,548,979 B2 | * | 4/2003 | Boisvert et al. ............. 318/469 |
| 6,867,563 B2 | * | 3/2005 | Ohshima ..................... 318/434 |

FOREIGN PATENT DOCUMENTS

JP          2002-295129 A      10/2002

* cited by examiner

*Primary Examiner*—Rina Duda
(74) *Attorney, Agent, or Firm*—Sughrue Mion, PLLC

(57) ABSTRACT

A power-window jamming preventing apparatus, includes a current sensing circuit, which senses a motor current flowing through a motor; a current limiting circuit, which increases and decreases the motor current based on a current-limitation control signal outputted from the current sensing circuit when an amount of increase of the motor current exceeds a predetermined vale; and a jamming determining circuit, which determines a jamming of a foreign matter in the window glass, and a potential difference generating circuit, which monitors a power source voltage supplied to the current sensing circuit and the power window motor, and which clamps a third reference voltage so as to drop a constant voltage from the third reference when the power source is low such that a potential difference between the second reference voltage and the third reference voltage is kept greater than a predetermined voltage.

2 Claims, 10 Drawing Sheets

POWER-WINDOW JAMMING PREVENTING APPARATUS

BACKGROUND OF THE INVENTION

The present invention relates to an apparatus for preventing a jamming of a foreign matter (e.g., finger, neck, or the like of the passenger) in a power window of a vehicle and, more particularly, improvement in a power-window jamming preventing apparatus for determining quickly a jamming of a foreign matter without error.

An apparatus for automatically opening/closing a window glass of a vehicle is normally called a power window, and is an apparatus that opens/closes the window glass by a motor. A power-window jamming preventing apparatus is employed to provide the jamming protection to the power window as the countermeasure to prevent the jamming of the foreign matter in the window glass. In the normal power-window jamming preventing apparatus, the load applied to the jammed foreign matter is extremely increased because of an increase of the motor current when the jamming of the foreign matter occurs during the lifting of the window glass, and therefore the motor current must be limited to suppress such increase of this motor current.

Therefore, the power-window jamming preventing apparatuss improved to take account of the above circumstances were proposed (for example, see JP-A-2002-295129).

In the description in the following drawings, the same or like symbols are affixed to the same or functionally like portions.

The power-window jamming preventing apparatus proposed in JP-A-2002-295129 will be explained in detail with reference to the accompanying drawings hereunder.

(Outline of the Power-window Jamming Preventing Apparatus)

FIG. 3 is a block diagram of an example of the power-window jamming preventing apparatus proposed in JP-A-2002-295129. This power-window jamming preventing apparatus has an abnormal current (generated by a jamming, or the like) sensing circuit 2, a power-window motor 5 having a forwarding/reversing circuit, a jamming determining circuit 6, and a motor current limiting circuit 7. In this case, the power-window motor 5 having the forwarding/reversing circuit may be considered as the forwarding/reversing circuit 5 containing the power-window motor. Three circuits of the current sensing circuit 2, the forwarding/reversing circuit 5, and the current limiting circuit 7 are connected in series with an electric wire 1 through which a motor current ID flows, and are connected to a power supply device VB.

(Outline of the Abnormal Current (Generated by the Jamming, or the Like) Sensing Circuit 2)

The current sensing circuit 2 senses an abnormal current generated in the motor current ID by the jamming, or the like, and then outputs an abnormal current sensing signal (current-limitation control signal) to the current limiting circuit 7 via a signal line 9. The current sensing circuit 2 has a multi-source field effect transistor (FET) or a multi resistor, a current following circuit 3, and a starting circuit 4.

The multi-source FET is composed of a main FET and a reference FET. Also, the multi resistor is composed of a shunt resistor and a reference resistor. A current sensing ratio n of the multi-source FET or the multi resistor, i.e., a resistance component ratio of the reference resistor to the main resistor, for example, is set in excess of 1, preferably set to 100 or more. The motor current ID is supplied to the main FET or the shunt resistor. Then, a reference current Iref is controlled in such a manner that the reference current Iref that satisfies a condition of $ID = n*Iref$ flows through the reference FET or the reference resistor.

In the case where the main FET or the shunt resistor is present on the high side of the motor (the power supply side with respect to the motor), a source potential of the main FET or a motor-side potential VSA of the shunt resistor and a source potential of the reference FET or a ground-side potential VSB of the reference resistor must be set to satisfy a condition of $VSA = VSB$ so as to satisfy the above condition $ID = n*Iref$. If the motor current ID is changed owing to change in a driving force of the window glass when the motor is normally running, the source potential VSA of the main FET, etc. are also changed, but the condition of $VSA = VSB$ is maintained by controlling the reference current Iref.

Next, a method of sensing the abnormal current generated by the jamming, or the like will be explained hereunder. The reference current Iref is classified into two current components each having a different following speed. The reference current Iref is classified into a current component Iref-s having a slow following speed and a current component Iref-f having a fast following speed. The current component Iref-s having a slow following speed is set such that such component follows the change in the motor current ID when the motor is normally running but cannot follow sudden change of the motor current ID when the jamming occurs. In contrast, the current component Iref-f having a fast following speed is set such that such component can follow not only change in the current when the jamming occurs but also a ripple component contained in the motor current ID. If the following characteristic of the current component Iref-f having a fast following speed is improved more and more, the current component Iref-s having a slow following speed is not needed to change and is stabilized. In order to satisfy such condition, the following speed of the current component Iref-f having a fast following speed is set 800 to 1000 times quicker than the current component Iref-s having a slow following speed.

When setting in this manner, the current component Iref-f having a fast following speed reflects exactly the change in the motor current ID except the ON/OFF operation of the semiconductor switching element. The change in the motor current ID is converted into a voltage by passing the current component Iref-f having a fast following speed through a resistor having a resistance value larger than the reference resistor. An amplified variation of an infinitesimal variation obtained by converting the change in the motor current ID into a voltage via an ON resistance of the shunt resistor or the main FET can be sensed by the conversion of this voltage.

When the jamming occurs, the current component Iref-f having a fast following speed is increased to follow the motor current ID, while the current component Iref-s having a slow following speed is seldom changed. As a result, a difference is generated between an average value of the current component Iref-f having a fast following speed and the current component Iref-s having a slow following speed, and thus a magnitude relationship of (average value of Iref-f)>(Iref-s) is derived. If this magnitude difference exceeds a previously set value, the abnormal current sensing signal is generated and then the multi-source FET placed on the high side of the motor or the semiconductor switching element (the FET or the bipolar transistor) in the current limiting circuit 7 placed on the low side of the motor is turned off.

Then, the multi-source FET or the semiconductor switching element placed on the low side of the motor execute the operation to repeat the ON/OFF operation and the continuous ON operation during when the jamming occurs. Although explained in detail hereunder, the increase of the motor current ID can be limited by the operation to repeat the ON/OFF operation and the continuous ON operation.

(Outline of the Motor Current Limiting Circuit 7)

The current limiting circuit 7, when receives the abnormal current sensing signal, limits the current not to increase the motor current ID. This limitation is executed by causing the multi-source FET or the semiconductor switching element placed on the low side of the motor to repeat alternately the ON/OFF operation and the continuous ON operation. The operation signal to repeat the ON/OFF operation and the continuous ON operation is output to the jamming determining circuit 6 via a signal line 10. The current limiting circuit 7 has the semiconductor switching element such as FET, or the like for ON/OFF-controlling the motor current ID, and a reference voltage circuit 8 for generating an ON reference voltage and an OFF reference voltage of the semiconductor switching element.

When the motor current ID enters into the repeating operation of the ON/OFF operation and the continuous ON operation, such motor current ID is limited to keep an average value at a value that is slightly larger than a value obtained immediately before the jamming occurs. A motor torque is in proportion to the motor current, and accordingly the motor torque is kept at a torque that is slightly larger than a torque required for the drive of the window glass. If such required minimum torque is ensured, the minimum jamming load can be realized under the condition that the false reversion is not caused even though a glass driving force is momentarily varied due to the rough road, or the like.

(Outline of the Jamming Determining Circuit 6)

The jamming determining circuit 6 determines whether or not the jamming occurred, based on the input operation signal to repeat the ON/OFF operation and the continuous ON operation. The jamming determining circuit 6, when determines that the jamming occurred, outputs a window-down signal to the effect that the window glass is opened to the forwarding/reversing circuit 5 via a signal line 11.

In the determination of the jamming, such an event is utilized that a period of the ON/OFF operation of the semiconductor switching element is prolonged and a period of the continuous ON operation of the semiconductor switching element is shortened while the number of revolution of the motor is lowered owing to the jamming. For example, when the period of the ON/OFF operation comes up to a predetermined length, it is decided that the jamming occurred. When the occurrence of the jamming is determined, the motor 5 is stopped by shutting off the multi-source FET or the semiconductor switching element, and then the motor 5 is reversed/driven after a predetermined time lapsed. Accordingly, the window glass is opened and the inserted foreign matter can be prevented from being jammed.

(Outline of the Power-window Motor 5 Having the Forwarding/reversing Circuit)

The forwarding/reversing circuit 5 runs the motor in the direction to close the window glass by inputting a window-up signal, and runs the motor in the direction to open the window glass by inputting a window-down signal. Also, the forwarding/reversing circuit 5, when receives the window-down signal via the signal line 11, inverts the revolution of the motor from the direction to close the window glass to the direction to open the window glass. The forwarding/reversing circuit 5 has an H-bridge circuit or a relay circuit. When the H-bridge circuit is used, four FETs to constitute or connect the H-bridge circuit are used. The current sensing circuit 2 and the current limiting circuit 7 may be constructed by using the transistor on the high side out of four FETs, or the current sensing circuit 2 may be constructed by using the transistor on the high side and the current limiting circuit 7 may be constructed by using the transistor on the low side.

FIGS. 4A to 4C show a variation of a block diagram of the power-window jamming preventing apparatus. More particularly, the current sensing circuit 2 is connected to a plus terminal of the power supply device VB or a ground that is equivalent to a minus terminal, and the sequence in which the motor current ID is supplied to the forwarding/reversing circuit 5 and the current limiting circuit 7 may be set arbitrarily. More particularly, the sequence like the current sensing circuit 2→the current limiting circuit 7→the forwarding/reversing circuit 5, as shown in FIG. 4A, the sequence like the current sensing circuit 2→the forwarding/reversing circuit 5→the current limiting circuit 7 (i.e., the same sequence as shown in FIG. 3), as shown in FIG. 4B, the sequence like the forwarding/reversing circuit 5→the current limiting circuit 7→the current sensing circuit 2, as shown in FIG. 4C, and others may be selected. It may be concluded that no large difference of the action and the effect of the power-window jamming preventing apparatus is caused because of the difference of the sequence.

FIG. 5 shows an example of a circuit diagram of the power-window jamming preventing apparatus. The circuit configurations and the circuit operations of the current sensing circuit 2, the current limiting circuit 7, and the jamming determining circuit 6 in the power-window jamming preventing apparatus will be explained in detail herein.

1. Explanation of the Current Sensing Circuit 2

1-1. Circuit Configuration of the Current Sensing Circuit 2

A circuit for classifying the reference current Iref into two current components Iref-s and Iref-f each having the different following speed by using the shunt resistor and the reference resistor to sense the abnormal current will be explained hereunder.

The current sensing circuit 2 in FIG. 5 has a shunt resistor R1 and a reference resistor R20 both connected to the plus terminal of the power supply device VB, a current following circuit 3 connected to the resistors R1 and R20, a comparator CMP2 whose plus input terminal and minus input terminal are connected to the current following circuit 3 and whose output terminal is connected to the current limiting circuit 7, and a resistor R25 connected between a 5V power supply and the output terminal of CMP2.

The current following circuit 3 has a comparator CMP1 whose plus input terminal is connected to the reference resistor R20 and whose minus input terminal is connected to the shunt resistor R1, a first charging/discharging circuit constructed by connecting a resistor R21 and a grounded capacitor C1 in series and connected to an output terminal of CMP1, a second charging/discharging circuit constructed by connecting a resistor R22 and a grounded capacitor C2 in series and connected to the output terminal of CMP1, a resistor R28 connected between the capacitors C1 and C2, an nMOSFET (T21) whose drain terminal is connected to the plus input terminal of CMP1 and whose gate terminal is connected to the capacitor C1, a first source follower circuit constructed by a resistor R23 whose one end is connected to a source terminal of FET (T21) and the plus input terminal of CMP 2 and whose the other end is grounded, an nMOS- FET (T22) whose drain terminal is connected to the plus input terminal of CMP1 and whose gate terminal is connected to the capacitor C1, a diode D21 whose anode terminal is connected to a source terminal of FET (T22), and a second source follower circuit constructed by a resistor R24 whose one end is connected to a cathode terminal of the diode D21 and the minus input terminal of CMP 2 and whose the other end is grounded.

In this case, 910K labeled to the resistor R21, etc. in FIG. 5 denotes that a resistance value of the resistor R21 is 910 KΩ. Similarly, 0.1 uf labeled to the capacitor C2, etc. denotes that a capacitance value of the capacitor C2 is 0.1 μF.

1-2. Explanation of an Operation of the Current Sensing Circuit 2

In FIG. 5, the shunt resistor R1, the forwarding/reversing circuit 5, and a semiconductor switching element (FET) T1 used to execute the ON/OFF operation are connected in series with the electric wire 1, through which the motor current ID flows, and connected between the plus terminal and the minus terminal of the power supply device (e.g., battery) VB. Forwarding/reversing relays in the forwarding/reversing circuit 5 are driven by transistors T2 and T3 respectively, and T2 is turned ON in the forwarding (up) operation while T3 is turned ON in the reversing (down) operation. The multi resistor is composed of the shunt resistor R1 and the reference resistor R20. In the circuit example in FIG. 5, a resistance value of R1 is set to 34 mΩ, and a resistance value of R20 is set to 55Ω. The motor current ID flows through the shunt resistor R1 and the reference current Iref flows through the reference resistor R20. For convenience of explanation, the resistance value of the resistor R1, the capacitance value of the capacitor C2, and others are represented by the same symbol R1 as the resistor R1, and others. Thus, the current ratio n to satisfy the condition of R1*ID=R20*Iref is given by Eq.(1).

$$n = ID/Iref = R20/R1 = 55/0.034 = 1618 \quad \text{Eq.(1)}$$

The comparator CMP1 consists of an OP amplifier, and a motor-side potential of the shunt resistor R1 is input into the minus input terminal of CMP1 and a ground-side potential of the reference resistor R20 is input into the plus input terminal of CMP1. The first charging/discharging circuit constructed by connecting the resistor R21 and the capacitor C1 in series is connected to between the output of CMP1 and a ground potential level (GND), and the capacitor C1 is charged/discharged by an output (charge/discharge control signal CMP1_OUT) of CMP1 via the resistor R21. The non-grounded side of the capacitor C1 is connected to the gate terminal of FET T21, the drain terminal of FET T21 is connected to the reference resistor R20, and the source terminal of FET T21 is grounded via the resistor R23. Since FET T21 and the resistor R20 constitute the first source follower circuit, a current that is proportional to a potential of the capacitor C1 flows through FET T21 and the resistor R20. This current serves as the current component Iref-s having a slow following speed in the reference current Iref. In contrast, the second charging/discharging circuit constructed by connecting the resistor R22 and the capacitor C2 in series is connected to between the output of CMP1 and the ground potential level (GND), and the capacitor C2 is charged/discharged by the output of CMP1 via the resistor R22. The non-grounded side of the capacitor C2 is connected to the gate terminal of FET T22, the drain terminal of FET T22 is connected to the reference resistor R20, and the source terminal of FET T22 is grounded via the resistor R24. Since FET T22, the diode D21, and the resistor R24 constitute the second source follower circuit, a current that is proportional to a potential of the capacitor C2 flows through FET T22, the diode D21, and the resistor R24. This current serves as the current component Iref-f having a fast following speed in the reference current Iref. The non-grounded sides of the capacitors C1 and C2 are connected via the resistor R28, so that potentials of the capacitors C1 and C2 are made equal to each other when the motor current ID is not changed. In other words, two charging/discharging circuits consisting of the capacitors C1, C2 and the resistors R21, R22 are connected in parallel to the output of the comparator CMP1, and two source follower circuits that flow the current in proportion to the potentials of respective capacitors C1 and C2 are connected in parallel between the reference resistor R20 and the ground. A time constant of the first charging/discharging circuit is set larger than that of the second charging/discharging circuit. In this circuit example, the time constant of the first charging/discharging circuit is given by Eq.(2) and the time constant of the second charging/discharging circuit is given by Eq.(3), and thus a ratio of time constants becomes 1:894.

$$\begin{aligned}
\text{(Time constant of the first charging/discharging circuit)} &= R21*(R22+R28)/(R21+R22+R28)*C1 \\
&= 910\,K*(5.1\,K+910\,K)/(910\,K+5.1\,K+910\,K)*1\,\mu f \\
&= 456\,ms
\end{aligned} \quad \text{Eq. (2)}$$

$$\begin{aligned}
\text{(Time constant of the second charging/discharging circuit)} &= R22*C2 \\
&= 5.1\,K*0.1\,\mu f \\
&= 0.51\,ms
\end{aligned} \quad \text{Eq. (3)}$$

The jamming is sensed by the comparator CMP2. A source potential of T21 is input into the plus input terminal of CMP2 and a potential that is lower than the source potential of T22 by a forward voltage drop of about 0.7 V in the diode D21 is input into the minus input terminal. Because gate-source potentials of T21 and T22 are almost equal to each other, an amount of the voltage drop in D21 corresponds to a sensed value of the abnormal current that is increased due to the jamming. The current component Iref-f is increased because of the occurrence of the jamming, an output (current-limitation control signal CPOUT_B) of CMP2 is changed from an H level to an L level. Then, an output of a NOR1 in the current limiting circuit 7 is shifted to an H level, a transistor T31 is turned ON, and the transistor T1 as the semiconductor switching element is turned OFF. The abnormal current generated due to the jamming at this time is sensed as follows.

(a) First, the reference current Iref is separated into the current component Iref-s having a slow following speed the current component Iref-f having a fast following speed, as shown in FIG. 5. The change of the motor current ID appears in the Iref-f to contain the ripple component, and is reflected exactly in a source potential of T22, i.e., a voltage (Vins) at the minus input terminal of CMP2. As a result, a source potential of T21 on the Iref-s side, i.e., a voltage (Vc) at the plus input terminal of CMP2 is not subjected to the influence of a fast variation of the motor current ID, and reflects only an average value taken over a long period. Therefore, the above potential is kept at an almost constant potential while the current limitation is being carried out after the jamming occurred, whereby the ideal reference voltage can be realized.

(b) A variation component caused by the ripple component of the motor current is contained in the current component Iref-f having a fast following speed. Assume that an amplitude of the ripple current is ΔID-rip and the ripple component of the Iref-f is ΔIref-f-rip, ΔIref-f-rip=ΔID-rip/n is satisfied. In the case where R24=1.5KΩ and ΔID-rip=0.5 A, a voltage variation ΔVrip generated in the resistor R24 by ΔIref-f-rip becomes 0.46 V, as given by Eq. (4).

$$\Delta Vrip = \Delta Iref\text{-}f\text{-}rip * R24 \qquad \text{Eq. (4)}$$
$$= \Delta ID\text{-}rip / n * R24$$
$$= 0.5 \, A / 1618 * 1.5 \, K$$
$$= 0.46 \, V$$

That is, the voltage at the minus input terminal of CMP2 is oscillated by the ripple component at an amplitude ±0.23V (±ΔVrip/2). Therefore, the output of CMP2 is inverted from the H level to the L level when the average value of the Iref-f is increased by 0.47V (=0.7V−0.23V).

This 0.47V is calculated as 0.51 A (=0.47V/R24*n= 0.47V/1.5K*1618) in terms of the motor current ID. That is, in the circuit example in FIG. 5, when the average value of the motor ID is increased by 0.51 A due to the jamming, the output of CMP2 is shifted to the L level and then T31 is turned ON and T1 goes to its OFF state.

(c) As shown in FIGS. 6A to 6C, since the motor current is increased before the output of CMP2 is inverted into the L level (prior to a time t1), the output of CMP2 is at the H level. When T31 is turned ON, the motor current ID start to decrease with delay corresponding to a time during when the charges that are excessively charged in the gate of T1 are discharged. The output of CMP1 starts to shift from the H level to the L level at this point of time. However, since CMP1 is composed of the OP amplifier, a delay time is generated owing to the delayed response of the OP amplifier when such output is changed from the H level to the L level.

Since C2 is charged during a time t1 required until the output of CMP1 is lowered from the H level and becomes equal to the potential of the capacitor C2 after the output of CMP2 is inverted to the L level, the Iref-f is increased and the voltage at the minus input terminal of CMP2 is increased. Then, C2 starts to discharge when the output of CMP1 becomes lower than the potential of C2. The voltage at the minus input terminal of CMP2 goes back to the original voltage, i.e., the voltage at which the output of CMP2 is started to shift from the H level to the L level, after a time t2 required until the discharging of the charges stored for the time t1 is completed. The voltage at the plus input terminal is not changed during this time.

After the time t2 lapsed, the output of CMP2 is inverted to the H level and also FET T1 is turned ON. That is, the output of CMP2 is kept at the L level for a time t1+t2 after the motor current ID is increased and then the output of CMP2 is inverted to the L level. If the potential of C2 is located between the H level and the L level of the output of CMP1, a relationship of t1≈t2 is derived. The time t1+t2 is decided dependent upon a turn-OFF delay time of T1, a response speed of the OP amplifier, and a decreasing rate of the motor current ID. In this case, because the turn-OFF delay time of T1 and the response speed of the OP amplifier are constant, such time t1+t2 depends on the decreasing rate of the motor current ID and becomes longer as the decreasing rate becomes slower.

When the output of CMP2 is shifter again from the L level to the H level and also T1 is turned ON, the motor current ID starts to increase. Therefore, the output of CMP1 goes from the L level to the H level, but C2 is continued to discharge during when the output of CMP1 is lower than the potential of C2. Suppose that a time required until the output of CMP1 becomes equal to the potential of the capacitor C2 after the output of CMP2 is inverted to the H level is a time t3. When the output of CMP1 exceeds the potential of the capacitor C2, such capacitor C2 is started to charge. When a time t4 required until the charge having the same charge quantity as that being discharged for the time t3 is charged lapsed, the output of CMP2 is inverted to the L level and the T1 is turned OFF. In other words, the output of CMP2 is maintained at the H level for the time t3+t4. The time t3+t4 is decided based on the response speed of the OP amplifier and an increasing rate of the motor current ID. Because the response speed of the OP amplifier is constant, the time t3+t4 depends on the increasing rate of the motor current ID and is shortened smaller as the increasing rate is accelerated.

(d) The reason why the forward voltage drop of the diode D21 is used to set a jamming sensing value is to keep the jamming sensing value constant even though the motor current ID is changed and thus the average value of the Iref-f is changed. However, since the forward voltage drop of the diode D21 cannot be changed by this method when the jamming sensing value must be changed, such jamming sensing value is changed by adjusting a resistance value of the resistor R24. As understood from the explanation in the item (b), the jamming sensing value becomes small if the value of the resistor R24 is increased whereas the jamming sensing value becomes large if the value of the resistor R24 is decreased conversely.

(e) It is feasible to set the jamming sensing value by using a resistor in place of the diode D21. In this case, when the motor current ID is increased, the jamming sensing value is increased in proportion to this.

2. Explanation of the Current Limiting Circuit 7

2-1. Circuit Configuration of the Current Limiting Circuit 7

The current limiting circuit 7 in FIG. 5 includes a NOR gate NOR1 whose input terminal is connected to the output terminal of CMP2, a comparator CMP3 whose output terminal is connected to the input terminal of NOR1, the reference voltage circuit 8 connected to a minus input terminal of CMP3, the semiconductor switching element T1 whose drain terminal is connected to a plus input terminal of CMP3 and whose source terminal is grounded, a variable resistor R32 connected to a gate terminal of the switching element T1, an FET (T31) whose gate terminal is connected to an output terminal of NOR1, whose drain terminal is connected to the resistor R32, and whose source terminal is grounded, a resistor R31 connected between the plus terminal of the power supply device VB and the drain terminal, a resistor R33 connected between the plus input terminal of CMP3 and the ground, and a resistor R37 connected between the output terminal of CMP3 and the 5V power supply.

The reference voltage circuit 8 has a resistor R35 connected between the minus input terminal of CMP3 and the power supply device VB, a resistor R36 connected between the minus input terminal of CMP3 and the ground, a resistor R34 connected to the minus input terminal of CMP3, a diode D31 whose anode terminal is connected to the resistor R34, and an FET (T32) whose drain terminal is connected to a cathode terminal of the diode D31, whose source terminal is grounded, and whose gate terminal is connected to the output terminal of CMP3.

2-2. Explanation of an Operation of the Current Limiting Circuit 7

The limitation of the motor current ID is carried out by using the current sensing circuit 2 and the current limiting circuit 7 in combination.

At first, the operation of the current limiting circuit 7 will be explained hereunder. When an output of the comparator CMP2 in the current sensing circuit 2 is at the H level, an output of the NOR gate NOR1 becomes the L level, the transistor T31 is turned OFF, and the switching element (transistor) T1 is turned ON. Explanation will be made of the case where T1 is formed of FET. At this time, since the voltage at the plus input terminal of the comparator CMP3 is connected to the drain terminal of T1, the almost ground potential level is input to the terminal. In contrast, the voltage at the minus input terminal of the comparator CMP3 is decided by the reference voltage circuit 8 that consists of R34, R35, R36, the diode D31, and the transistor T32. When R34=3.3KΩ, R35=10KΩ, R36=24KΩ are set and the power supply voltage VB is set to 12.5V, such voltage becomes 8.82V if T32 is turned OFF while such voltage becomes 3.03V if T32 is turned ON. Since the voltage is never lowered smaller than 3.03V in any case, the output of CMP3 is at the L level. Thus, T32 is in its OFF state. When the jamming occurs and the output of the comparator CMP2 goes to the L level, the output of NOR1 goes to the H level, the T31 is turned ON, and the T1 is turned OFF. The drain voltage VDS of the. T1 starts to increase from the ground potential level. Since T32 was turned OFF, the voltage at the minus input terminal of the CMP3 is 8.82V. When the drain voltage VDS of T1 goes to 8.82V or more, the output of CMP3 is inverted into the H level, the output of NOR1 goes to the L level, and T31 is turned OFF and T1 is turned ON. At this time, since T32 is also turned ON at the same time, the minus input voltage of CMP3 is lowered to 3.03V. As a result, T1 holds its ON state until the drain voltage VDS is lowered to 3.03V or less once T1 is turned ON. When the drain voltage VDS of T1 is reduced lower than 3.03V, the output of CMP3 goes to the L level once again, T1 is turned OFF and simultaneously T32 is turned OFF, and the minus input terminal of CMP3 is increased up to 8.82V. T1 maintains its OFF state until the drain voltage VDS of T1 exceeds 8.82V. This operation corresponds to one period of the ON/OFF operation, and this state is continued inasmuch as the output of CMP2 is at the L level.

Constancy of the Motor Current in the ON/OFF Operation

Next, the event that the motor current ID is scarcely changed in one period of the ON/OFF operation when the ON/OFF operation is executed will be explained hereunder. A static characteristic curve to which a load line of FET T1 is added is shown in FIG. 7. When the motor is normally running before the jamming occurs, T1 operates at an A point. When the motor load current ID is changed, the operating point moves vertically between the A point and a B point, for example, in the ohmic range. When the jamming occurs, the load current ID of the motor is increased and the operating point of T1 moves upward. When the operating point comes up to the B point, T1 is turned OFF. A current difference between the B point and the A point shows the jamming sensing value. When T1 is turned OFF, the drain-source voltage VDS is extended but the operating point of T1 at that time moves rightward on a horizontal line passing through the B point. In other words, the drain current ID (=the motor load current) keeps as it is the value obtained when T1 is turned OFF and the drain-source voltage VDS of T1 is extended. This is because, when the drain-source voltage VDS of T1 moves between the ground potential level and the power supply voltage, the gate-drain capacitance CGD of T1 is apparently increased by the Miller effect and thus the drain-source voltage VDS is seldom changed.

Miller Effect

FIG. 8 is an equivalent circuit diagram of the switching element T1. Suppose that the drain-source voltage VDS is increased by an infinitesimal voltage ΔVGS based on the charging executed via the gate driver. Accordingly, the motor current ID is increased by ΔID and thus a counter electromotive force Ec (=L*dID/dt) is generated by an inductance L of the motor. A charge ΔQ charged in the gate-drain capacitance CGD is given by Eq. (5).

$$\Delta Q = CGD*(\Delta VGS + \Delta ID*Ra + Ec) \quad \text{Eq.(5)}$$

where Ra is an armature resistance. Also, a capacitance Cm of CGD, which is from the gate terminal, is given by Eq.(6).

$$Cm = \Delta Q/\Delta VGS = CGD*(1 + \Delta ID*Ra/\Delta VGS + Ec/\Delta VGS) \quad \text{Eq.(6)}$$

The capacitance Cm is the "Miller capacitance" and is the apparent capacitance generated by the fact that a voltage change across the capacitance CGD is considerably larger than ΔVGS. When the gate driver charges/discharges the gate charge of FET via the gate resistance RG, the capacitance that can be seen from the driver side is not CGD but Cm. When the inductance L of the motor becomes large, the capacitance Cm has a large value rather than CGD and thus the gate-source voltage VGS is seldom changed even though the gate driver charges/discharges the gate of T1 in the ON/OFF operation. However, the Miller effect is effective only when the drain potential VDS of the main FET (T1) can be changed freely between the ground potential level (GND) and the power supply voltage (VB). At this time, since T1 is in the pinch-off range, ID=Gm*VGS is satisfied where Gm is a transfer conductance of T1. It is appreciated from this Equation that ID is not changed and is kept almost constant if VGS becomes almost constant.

Suppose that, when the transistor T32 is turned ON and OFF in FIG. 5, the voltage at the minus input terminal of the comparator CMP3 is given by VL and VH FIG. 7 respectively. In this circuit example, VL=3.03V and VH=8.82V are given. When the operating point of T1 moves rightward on a horizontal line passing through the B point in FIG. 7 and the drain voltage VDS exceeds the voltage VH, the output of CMP3 goes to the H level and T1 is turned ON. In the actual circuit, because of a delay in the circuit, T1 is turned ON after a while after the drain voltage VDS exceeds VH. In FIG. 7, T1 is turned ON at a C point at which the VDS exceeds 10V, and VDS goes down toward the ground potential level. When VDS is lowered smaller than the voltage VL, the output of CMP3 goes to the L level and T1 is turned OFF once again. In this manner, T1 continues the ON/OFF operation as far as the output of CMP2 is at the L level.

Reduction of ID by the ON/OFF Operation

Next, the event that the drain current ID is reduced gradually during when the ON/OFF operation is continued will be explained hereunder. Since the drain voltage VDS of T1 is restricted by the reference voltages VL and VH when the ON/OFF operation is started, the operating point of T1 oscillates between the C point and the D point in FIG. 7. The average value of VDS at this time is at a G point and is located substantially in the center between the C point and the D point. The G point is the DC-like operation point of T1. In contrast, a line segment CD gives an AC operating curve. In FIG. 7, a straight line a gives a load line of T1 when the motor is stopped in the case where the power supply device VB is set to 12.5V, and a gradient is decided by the armature resistance Ra. Straight lines b to g are in parallel with the straight line a, and their projections onto the axis of abscissa can represent an amount of the voltage drop respectively when the drain current ID (=the motor current) is supplied to the motor.

First, the situation immediately before the jamming occurs will be considered herein. The operation point of T1 at this time exists in the A point. Assume that the counter electromotive force of the motor is Emotor-A and the drain-source voltage is VDSon, Eq.(7) is given as follows.

$$VB = VDSon + Ra*ID + Emotor\text{-}A \qquad \text{Eq. (7)}$$

Next, the situation immediately after the jamming occurs and then the ON/OFF operation is started will be considered herein. ID consists of an AC component IDA that varies in synchronism with the ON/OFF operation, and a DC-like component IDD other than this IDA. That is, ID has a relationship ID=IDA+IDD. A counter electromotive force Eonoff is generated by the inductance of the motor when IDD is changed. A magnitude of the force is calculated by Eq.(8).

$$Eonoff = L*d(IDD)/dt \qquad \text{Eq.(8)}$$

Assume that an average value of the drain-source voltage VDS of T1 in the ON/OFF operation is VDSonoff. This corresponds to the G point in FIG. 7. Suppose that the number of revolution of the motor is not changed in one period of the ON/OFF operation. In addition, since ID is not changed, Eq.(9) is given.

$$VB = VDSonoff + Ra*ID + Emotor\text{-}A + Eonoff \qquad \text{Eq.(9)}$$

Subtracting both sides in Eq.(9) from both sides in Eq.(7) respectively gives Eq.(10).

$$0 = VDSon - VDSonoff - Eonoff$$

$$Eonoff = VDSon - VDSonoff \qquad \text{Eq.(10)}$$

where VDSon is a drain-source voltage in the continuous ON operation and is about 0.3 V, and VDSonoff is the voltage at the G point and is about 6.5 V. Thus, Eonoff has a minus value of −6.2V from Eq.(10). Then, it is seen that IDD is reduced smaller than that in Eq.(8) because Eonoff has the minus value.

Implementation of the Minimum Reversing Load (Prevention of the Malfunction Caused Due to the Rough Road, or the Like)

When the DC-like component of the ID goes down from the operating point G to the operating point H while executing the ON/OFF operation, the Iref-f is reduced to follow IDD. Then, when IDD reaches the H point in FIG. 7, the CMP2 is inverted from the L level to the H level, the operating point of FET T1 moves from the H point to the F point, and T1 enters into its continuous ON state. When T1 is brought into its continuous ON state, ID is increased, the operating point goes to the B point via the A point, and T1 enters into its ON/OFF operation once again. Since Iref-s is not changed for this while, the voltage at the plus input terminal of CMP2 is not changed and thus the A point is fixed and the B to F points are not changed correspondingly. The value of the current ID is restricted within a predetermined range during when the ON/OFF operation and the continuous ON state are repeated.

The average value of the current ID that is restricted within the predetermined range is maintained at the value that is slightly larger than the value of the current ID immediately before the current limiting operation is executed. This condition has two important meanings.

First, a motor torque can be limited within a predetermined range since the motor torque is in proportion to the current. Thus, the jamming load can be limited.

Second, the malfunction such that the motor is reversed although the jamming does not occur during the running on the rough road, or the like can be prevented. When the power window is operated during the running on the rough road, or the like, it is possible that the driving force of the window glass is changed by the vertical motion of the car body and such driving force is increased momentarily, the number of revolution of the motor is lowered correspondingly, ID is increased, T1 is turned OFF, and the current limiting mode is applied. However, since the preceding glass driving force is still maintained even though the current limiting mode is applied, the number of revolution of the motor can be restored into the original state when the increase of the load due to the vertical motion is eliminated, so that the false reversion can be avoided. In this case, the premise that the glass driving force is not changed for this while is needed. Also, this premise can be satisfied in most cases. According to above features, the minimum reversing load can be implemented under the condition that the false reversion is not caused by the momentary increase of the driving force caused due to the rough road, or the like.

Changes in the ON/OFF Operation Period and the Continuous ON Period According to the Reduction in the Number of Revolution of the Notor Next, the case where Eq.(7) and Eq.(9) are generalized will be considered herein. The number of revolution of the motor is lowered when a time lapsed for a while after the jamming occurs. Since the counter electromotive force of the motor is proportional to the number of revolution of the motor, a relationship of Emotor-B<Emotor-A is given if the counter electromotive force of the motor at that time is assumed as Emotor-B shown in FIG. 7. If T1 is brought into the continuous ON state by the counter electromotive force having this lowered number of revolution, i.e., an magnitude of Emotor-B, the increasing rate of the current ID is accelerated unlike the previous state, and thus a counter electromotive force Eon is generated by the inductance L of the motor. Thus, Eon=L*dID/dt is derived. Rewriting Eq.(7) by using Eon, which is not given in Eq.(7), gives Eq.(11).

$$VB = VDSon + Ra*ID + Emotor\text{-}B + Eon \qquad \text{Eq.(11)}$$

Suppose that the number of revolution of the motor in Equation of the ON/OFF operation corresponding to Eq.(11) is not changed in both the continuous ON operation and the ON/OFF operation, replacing the Emotor-A in Eq.(9) with the Emotor-B gives Eq.(12).

$$VB = VDSonoff + Ra*ID + Emotor\text{-}B + Eonoff \qquad \text{Eq.(12)}$$

Eq.(13) is derived from Eq.(11) and Eq.(12).

$$Eon - Eonoff = VDSonoff - VDSon = 6.5V - 0.3V = 6.2V \qquad \text{Eq. (13)}$$

Because a sign of Eon is plus and a sign of Eonoff is minus, Eq.(13) signifies that the counter electromotive force Eonoff in the continuous ON operation and the counter electromotive force Eonoff in the ON/OFF operation have an opposite sign respectively and a sum of their absolute values becomes constant and is equal to a difference between respective VDSs, i.e., VDSonoff−VDSon. A difference between VDSs is constant regardless of the number of revolution of the motor. Since Emotor-B becomes small as the number of revolution of the motor is lowered, an absolute value of Eonoff becomes small and an absolute value of Eon becomes large. That is, it is understood that, when the number of revolution of the motor is lowered, the decreasing rate of ID in the ON/OFF operation is lowered and the increasing rate of ID in the continuous ON operation is accelerated.

In addition, as can be seen from FIG. 7, Eonoff obtained when the operation goes out of the ON/OFF operation (H point) (Eonoff-C in FIG. 7) becomes small rather than Eonoff obtained immediately after the operation enters into the ON/OFF operation (G point) (Eonoff-D in FIG. 7). This indicates that a decreasing rate of the current is reduced gradually during the ON/OFF operation period. Also, the state that Eon-E is smaller than Eon-F in FIG. 7 indicates that an increasing rate of the current is reduced gradually during the continuous ON operation period.

Period of the ON/OFF Operation

When T1 is turned ON, the gate charge of T1 is discharged via R32 and the gate-source voltage of T1 starts to reduce. Then, ID starts to reduce because ID=Gm*VGS. The counter electromotive force Ec is generated by the inductance L of the motor owing to the reduction of ID, and the voltage drop due to the armature resistance Ra is reduced though it is small. That is, the voltage drop of the motor is reduced by an amount of drop $\Delta VM$ (=Ec+Ra*$\Delta ID$). Where $\Delta ID$ denotes an amount of reduction of ID. Also, the counter electromotive force Ec can be calculated by Ec=L*$\Delta ID/\Delta t$. In this case, it is assumed that the number of revolution of the motor is not changed during one period of the ON/OFF operation.

The drain voltage VDS of T1 (which is equal to the drain-source voltage because the source is grounded) starts to increase because of an amount of drop $\Delta VM$ of the voltage drop of the motor. The gate-drain voltage of T1 is extended by $\Delta VM$ and the gate-drain capacitance CGD is charged by $\Delta VM$. Since the charge is supplied to the gate by this charging, the gate charge is not reduced even though the charge is discharged via R32. Therefore, the gate-source voltage VGS is substantially scarcely reduced. This is the Miller effect.

Then, VDS is increased if the discharging still continues via R32, and then T1 is turned OFF when VDS exceeds the reference voltage VH. Then, the current flows into the gate of T1 from the power supply voltage VB via the resistors R31 and R32 and thus the gate starts to be charged. When the gate-source voltage VGS starts to increase owing to the charging of the gate, ID increases and the gate charge is absorbed by the Miller effect, as in the case of the discharging of the gate charge. That is, the charges charged via R31 and R32 are canceled by the Miller effect. Then, VDS is lowered when the charging of the gate proceeds, then the output of CMP3 goes to the L level when VDS becomes smaller than the reference voltage VL, and then T1 is brought into its OFF state.

A quantity of charge being supplied/canceled to/from the gate of T1 by the Miller effect is decided by the reference voltages VL and VH, and has a constant amount. A time required by the gate circuit to charge and subsequently discharge this quantity of charge gives one period of the ON/OFF operation. A charging time of the gate is decided by the power supply voltage VB and the gate resistances R31+R32, and a discharging time is decided by the gate resistance R32. That is, the period of the ON/OFF operation is decided by the reference voltages VL and VH, the power supply voltage VB, and the gate resistances R31 and R32. Therefore, the period of the ON/OFF operation can be varied by changing the gate resistances, more particularly the resistance R32.

3. Explanation of the Jamming Determining Circuit 6

3-1. Circuit Configuration of the Jamming Determining Circuit 6

The jamming determining circuit 6 in FIG. 5 has an input terminal that is connected to the output terminal of CMP3 in the current limiting circuit 7, and can be composed of a 16 pulse counter that is reset if it does not count for 80 $\mu$second.

3-2. Explanation of the Operation of the Jamming Determining Circuit 6

The power-window jamming preventing apparatus senses the jamming by the current sensing circuit 2, then limits the current by the current limiting circuit 7 to keep the motor current ID within the predetermined range, and then determines by the jamming determining circuit 6 whether or not the jamming occurs. A determining method will be explained herein. When the number of revolution of the motor is lowered by the jamming, the ON/OFF operation period of T1 is prolonged while the continuous ON operation period of T1 is shortened. It is determined by utilizing this characteristic whether or not the jamming occurs. There are three following methods as the particular determining method.

(a) The occurrence of the jamming is determined when a ratio of the continuous ON operation period and the ON/OFF operation period reaches a predetermined value while sensing the ratio. The continuous ON operation period and the ON/OFF operation period can be discriminated based on the output of CMP2. The operation is the continuous ON operation when the output of CMP2 is at the H level, and the operation is the ON/OFF operation when the output of CMP2 is at the L level. Therefore, a target ratio can be sensed if the output of CMP2 is averaged as the analog signal.

(b) The occurrence of the jamming is determined when the continuous ON operation period or the ON/OFF operation period reaches a predetermined value while counting the period. The determination is made by counting the H period or the L period of the output of CMP2.

(c) The occurrence of the jamming is determined when an ON/OFF frequency in the ON/OFF operation period reaches a predetermined value while counting the frequency. The leading frequency of the output level of CMP3 is counted, as shown in FIG. 5, and then the occurrence of the jamming is determined when the counted frequency reaches 16 pulses in the example in FIG. 5. In order not to count the frequency in the continuous ON operation period, the counter is reset when the pulse is interrupted for a predetermined period. In the example in FIG. 5, the counter is reset when the output of CMP3 is not changed for 80 $\mu$s. The number of revolution when the occurrence of the jamming is determined is set to a state in which such number of revolution is lowered by about 60% rather than the number of revolution prior to the occurrence of the jamming. This set value is at a level that is not generated by reduction in the number of revolution caused by the impulsive load change that is generated due to the rough road, or the like.

Method of Setting a Jamming Determining Value

A method of setting a jamming determining value is summed up as follows.

(i) A determining value is set at a level that is not generated by reduction in the number of revolution of the motor caused by the impulsive load change that is generated due to the rough road, or the like.

(ii) A continued period of the ON/OFF operation depends on the OFF delay time of T1 and the response characteristic of the OP amplifier used as CMP1. Therefore, the ON/OFF frequency corresponding to the determining value is decided based on standard values of these characteristics as the premise, and then a counter value is set.

(iii) When the determining value must be adjusted because the OFF delay time of T1 and the response characteristic of the OP amplifier are varied, the ON/OFF operation period is changed by varying the gate series resistance of T1 to deal with these variations. Accordingly, the counter value can be fixed even though the OFF delay time of T1 and the response characteristic of the OP amplifier are varied. It is convenient for the case where respective circuits are prepared as IC that the counter value can be fixed.

Change in the Number of Revolution of the Motor in the ON/OFF Operation

Explanation is made of the situation that the ON/OFF operation period is extended but the continuous ON operation period is shortened when the number of revolution of the motor is lowered. This explanation is made based on the assumption. That is, the assumption that the number of revolution of the motor is seldom changed in one period of the ON/OFF operation is made. This assumption is realized by such a method that the motor continues to push the glass with a constant force during the ON/OFF operation. Since the inter-terminal voltage of the motor is given as VB-VDSonoff in the ON/OFF operation, a motor output Pm is given by Eq.(14).

$$Pm = (VB-VDSonoff)*ID-Ra*ID2 \quad \text{Eq. (14)}$$
$$= (VB-VDSonoff-Ra*ID)*ID$$
$$= (Emotor-Eonoff)*ID$$

Followings can be understood by Eq.(14).

(i) In the ON/OFF operation, the almost constant output is output irrespective of the number of revolution of the motor.

(ii) In the ON/OFF operation, the output is lowered by VDSonoff*ID rather than the output in the continuous ON operation.

In other words, the motor outputs the constant output during the ON/OFF operation to drive the window glass. This means the motor continues to push the window glass, and the number of revolution of the motor is always linked with the speed of the window glass. Since the motion of the window glass is slow, such motion is seldom changed within one period of the ON/OFF operation. As a result, the number of revolution of the motor is also seldom changed within one period of the ON/OFF operation, so that the above assumption can be supported.

FIG. 9 is a circuit diagram showing a modified example of the power window jamming preventing apparatus of FIG. 5. The power window jamming preventing apparatus shown in FIG. 90 differs from the power window jamming preventing apparatus of FIG. 5 in current following circuits 3 and 13. According to the current following circuit 13, the second charging and discharging circuit R22, C2 and the resistor R28 for coupling the ungrounded sides of C1 and C2 are removed from the current following circuit 3 and the resistance value of the resistor R21 is changed in order to maintain the time constant of the first charging circuit in accordance with the change.

The change brings about a case in which the time constant of the second charging and discharging circuit of FIG. 5 is nullified and the followup speed of the component Iref-f having the fast followup speed of the reference current Iref is made to be infinitive. Therefore, although operation of the power window jamming preventing apparatus of FIG. 9 is basically the same as that of the circuit of FIG. 5, particularly, the operation of the circuit 13 can also be interpreted as follows.

The second charging and discharging circuit is eliminated, the current Iref-f flowing in the second source follower circuit becomes 1 n-th of the motor current ID always including that in the On/Off operation time and the voltage generated across both ends of the resistor R24 becomes as shown by Eq. (15) in comparison with the voltage generated across the both ends of the shunt resistor R1.

$$Iref*R24/(ID*R1) = R24/(n*R1) \quad \text{Eq. (15)}$$
$$= 1.5 \text{ k}\Omega/(1618*0.034 \text{ }\Omega)$$
$$= 27.3.$$

That is, a voltage constituted by amplifying the voltage drop of the shunt resistor R1 in proportion to the motor current ID in proportion to the motor current ID by 27.3 times is generated across both ends of the resistor R24 and a voltage averaging the voltage by an integrating circuit comprising R21 and C1 is generated across the both ends of the resistor R23. The respective generated voltages are operated to compare by CMP2.

FIG. 10 is a circuit diagram showing a modified example of the power window jamming preventing apparatus of FIG. 9. The power window jamming preventing apparatus shown in FIG. 10 differs from the power window jamming preventing apparatus of FIG. 9 in current following circuits 13 and 14. Points of difference between the circuits and the following two points.

(a) A point that the drain terminal of the transistor T21 is connected not to the reference resistor R20 but directly to the power source VB.

(b) A point that there are added a resistor R26 connected to the plus input terminal of CMP1, and a transistor T23 a drain terminal of which is connected to the resistor R26 a source terminal of which is grounded and a gate terminal of which is connected to the output terminal of CMP2.

Explanation of Operation

The motor current ID is inverted to the voltage by the shunt resistor R1. CMP1 controls such that the plus input terminal voltage and the minus input terminal voltage are always equal to each other and therefore, the current Iref flowing in the reference resistor R20 is proportional to ID such that Iref*n=ID. Therefore, when an amount of changing Iref when the motor current ID is changed by ΔID is designated by notation ΔIref, ΔrIref*n=ΔID is established.

When jamming is not brought about, the transistor T23 is made On and therefore, a current component Iref-2 of Iref is made to flow via R26 and T23. That is, Iref=Iref-f+Iref-2 is established. Since Iref-2 cannot be changed, all of the change of ΔIref of Iref is reflected to Iref-f and a voltage change ΔVR24 represented by Ep. (16) is generated in the resistor R24 in which Iref-f flows.

$$\Delta VR24 = \Delta Iref*R24 = (\Delta ID/n)*R24 \quad \text{Eq. (16)}$$

By taking a ratio of ΔVR24 to a voltage change ΔVR1 generated at the shunt resistor R1 (=ΔID*R1), as shown by Eq. (17), it is known that the voltage change across the both ends of the shunt resistor R1 is generated across the both ends of the resistor R24 by being amplified by 27.3 times.

$$\Delta VR24/\Delta VR1 = (R24/R1)/n \quad \text{Eq. (17)}$$
$$= (1.5 \text{ k}\Omega/34 \text{ m}\Omega)/1618$$
$$= 27.3$$

Meanwhile, although there is a voltage difference constituted by summing up a forward direction voltage drop of the diode D21 and the voltage between the gate and the source of T22 between the output voltage of CMP1 and the ungrounded side potential of R24, since the voltage difference can be regarded as a constant value, a change in the output of CMP1 is equal to a change in the ungrounded side potential of R24. Therefore, an amount of changing the ungrounded side potential of the capacitor C1 is an amount ΔVR24 of changing the ungrounded side potential of R24 averaged by the time constant R21*C21. The ungrounded side potential of the capacitor C1 is reflected to the source terminal of the transistor T21, that is, the plus input terminal of CMP2 except a difference of a direct current voltage. Meanwhile, the ungrounded side potential of R24 is inputted to the minus input terminal of CMP1. However, a direct current potential difference of an amount of 0.7V of the forward direction voltage drop of the diode D21 is applied between the plus input terminal and the minus input terminal.

Summarizing the above-described, the amount of change ΔID of ID is converted into the voltage of ΔVR1 by the shunt resistor R1. ΔVR1 constitutes ΔVR24 by being amplified by 27.3 times and applied to the minus input terminal of CMP2. A rate of converting current→voltage (ΔVR24/ΔID) at this occasion is represented by Eq. (18).

$$\Delta VR24/\Delta ID = 27.3 * R1 * \Delta ID/\Delta ID \quad \text{Eq. (18)}$$
$$= 27.3 * 34 \text{ m}\Omega$$
$$= 928 \text{ mV/A}$$

Meanwhile, the plus input terminal of CMP2 is applied with an average value of ΔVR24 and a direct current voltage difference of 0.7V is applied between the plus input terminal and the minus input terminal.

The motor current ID includes the pulsating current component. When a total amplitude of the pulsating current is set to 0.5 A, ΔVR24 includes an amount of varying the voltage of 928 mV*0.5 A=464 mV. That is, there is a variation having a half amplitude of ±232 mV and therefore, when an increase in voltage of 0.7V−0.232V=0.468V is generated, the output of CMP2 is inverted from H level to L level. That is, 0.468V becomes a jamming detecting value. When 0.468V is converted into ID, the current becomes 0.5 A (=0.468V/R24*n). When ID is increased by 0.5 A, the output of CMP2 is inverted.

When the output of CP2 becomes L level, the transistor T23 is made Off and the current Iref-2 which has been flowed in R26 and T23 is extinguished. At this occasion, since ID is not changed, the reference current Iref remains unchanged. Therefore, Iref-f is increased by an extinguished amount of Iref-2. Thereby, the voltage drop of R24 is increased and the minus input terminal voltage of CMP2 is increased. An amount of the increase becomes Iref-2*R24. When the output of CMP2 becomes at L level, the On/Off operation is started and ID is reduced. When an amount of reducing Iref by reducing ID exceeds Iref-2, CMP2 is inverted again to H level and ID is brought into the continuous On state to start increasing. When the output of CMP2 becomes at H level, T23 is made On, Iref-2 is made to flow, Iref-f is reduced by that amount and the minus terminal voltage of CMP2 is lowered by Iref-2*R24. When an amount of increasing Iref by increasing ID exceeds Iref-2, CMP2 is inverted to L level. When the output of CMP2 becomes at L level, since there is a delay of making FET T1 Off, ID is increased during a time period of the delay. Therefore, during the time period of L, the output of CMP2 is obliged to reduce by including not only Iref-2 but also an amount of increasing ID by the delay.

A maximum value of the motor current ID during the current restricting time period of repeating the On/Off operation and the continuous On operation is an average value of ID before jamming added with the jamming detecting value of 0.5 A (0.468V) and a minimum current value is determined by a magnitude of Iref-2. Therefore, the average value of ID in the current restricting operation can arbitrarily be set by adjusting the value of Iref-2.

The above-described is operation of the circuit of FIG. 10 and a difference thereof from the circuit of FIG. 5 is summarized below.

(i) Iref-f of FIG. 5 is not the change per se of ID. ΔIref-f*n≠ΔID is established. The potential difference generated across the both ends of the resistor R22 shows that there is a deviation between ID and Iref. Therefore, the voltage drop ΔVR24 generated at the resistor R24 by ΔIref-f does not accurately represent ΔID. The value may be larger than ΔID or smaller than ΔID. That is, an amplitude of ΔVR24 is larger than an amount in correspondence with ΔID. Therefore, the jamming determinant is substantially reduced to facilitate to start the On/Off operation. This signifies that there is increased a chance of erroneous operation by a variation in an impact load by a rough road or the like.

Meanwhile, in FIG. 10, ΔVR24 accurately represents ΔID and an influence by a deviation from ΔID is not brought about.

(ii) According to the circuit of FIG. 5, in the On/Off operation time, the variation of the output of CMP1 is increased and saturated at H level and L level. A deviation of the minus input terminal voltage of CMP2 from ΔID is increased to differ from the change in ID. The plus input terminal voltage of CMP2 remains unchanged and even when the minus input terminal voltage is controlled by being compared with the plus input terminal voltage, since ΔID does not coincide with the change in the minus input terminal voltage of CMP2, when the motor revolution number is reduced, ID is increased.

In contrast thereto, in FIG. 10, the change in the motor current is reflected to the minus terminal voltage of CMP2, a peak value in controlling the current is maintained constant.

(iii) In FIG. 5, the time period of continuing the On/Off operation is determined by the delay in making T1 Off, the response delay of CMP1 and the motor revolution number. Among them, the influence of the response delay time period of CMP1 is significant. Although a control of using Iref-2 can be carried out as in FIG. 10, even when Iref-2=0 A, there is a sufficient On/Off operation time period and when Iref-2 is used, the On/Off operation time period is excessively prolonged, which is not preferable in view of control. That is, the On/Off operation time period cannot be controlled from outside. (However, in the system of FIG. 9 making the followup speed of Iref-f infinitive, the control of using Iref-2 can be carried out). Meanwhile, in FIG. 10, although the delay of T1 and the motor revolution number constitute factors of determining the On/Off operation time period similar to FIG. 5, the response delay of CMP1 does not effect influence thereon. Further, by using Iref-2, the On/Off operation time period can substantially be controlled to an arbitrary value. When Iref-2 is increased, the On/Off operation time period is prolonged and therefore, the minimum value of ID can be reduced. The maximum value of ID can be maintained constant and the minimum value can be controlled and therefore, the average current value of ID in restricting the current can be set to a desired value.

(iv) In FIG. 5 and FIG. 9, Iref-s constituting a portion of Iref is made to flow in cooperation with C1. When jamming is brought about and ID is increased, the potential of C1 is hardly increased, however, the potential is not nullified. Iref-s is increased in correspondence with an amount of increasing the potential of C1 and an amount of increasing Iref-f is reduced by that amount. That is, the detection sensitivity becomes dull by that amount. Meanwhile, in FIG. 10, although the potential of C1 is increased similarly when jamming is brought about, the increase in C1 is not related to Iref and therefore, the increase in Iref-f is not restrained by increasing C1. Therefore, a deterioration in the detection sensitivity by increasing the potential of C1 is not brought about and a further accurate control can be realized.

As is known from the above-described fact, the circuit of FIG. 10 is more excellent than the system of FIG. 5 as the control of preventing jamming.

FIG. 11 shows a circuit diagram showing a modified example of the power window jamming preventing apparatus of FIG. 5. The power window jamming preventing apparatus shown in FIG. 1 differs from the power window jamming preventing apparatus of FIG. 5 in the current sensing circuit 2. The current limiting circuit 7, the regularly rotating the reversely rotating circuit 5 and the jamming determining circuit 6 stays the same although the circuits are simplified or omitted. Points of difference of the current sensing circuit 2 are the following two points.

(a) A point that the current following circuits 3 and 16 differ from each other. The current following circuit 16 is constituted by adding a resistor R29 connected to the plus input terminal of CMP1, a transistor T24 a drain terminal of which is connected to the resistor R29, a source terminal of which is grounded and a gate terminal of which is connected to an output terminal of a starting timer 15, and a diode D22 an anode terminal of which is connected to the capacitor C1 and a cathode terminal of which is connected to the capacitor C2 to the current following circuit 3.

(b) A point of adding a starting timer 15 an input terminal of which is connected to an input terminal of window up (Up) and the starting circuit 4 connected to an output terminal of the starting timer 15 and the current following circuit 16.

The starting circuit 4 includes:

nMOSFET (T42) a gate terminal of which is connected to the starting timer 15 and a source terminal of which is grounded;

a resistor R43 connected to a drain terminal of T42;

pMOSFET (T41) a gate terminal of which is connected to the resistor R43 and a drain terminal of which is connected to the plus terminal of the power source VB;

a resistor R41 connected between the gate terminal and the drain terminal of T41; and a resistor R42 connected to a source terminal of T41; and a diode D41 an anode terminal of which is connected to the resistor R42 and a cathode terminal of which is connected to the gate terminal of T21;

Explanation of Operation

There is provided a rush current masking time period such that the On/Off operation is not carried out by rise of the motor starting current ID (rush current) when the motor is started by the window up (Up) or the window down (Down) signal. From a view point as a safety apparatus, it is preferable to operate a jamming preventing function immediately after starting the motor. According to a system using a pulse sensor, since a resolution of a pulse is poor and a time period is needed for stabilizing the pulse and therefore, it is difficult to operate the jamming preventing function immediately after starting the motor. Meanwhile, according to a current detecting system used in the circuit, the response is fast and therefore, the jamming preventing function can be operated immediately after starting and a function as a safety apparatus more excellent than that of the pulse sensor system can be realized. FIG. 11 shows a circuit for realizing jamming prevention (jamming protection) immediately after starting.

When the Motor is Rotated During a Starting Masking Time Period

When the up or the down signal is inputted, the starting timer is operated, the transistor T24 in the current sensing circuit is made On, a reference current Iref-1 is made to flow by a starting timer operation time period. A magnitude of Iref-1 is determined by the power source voltage and the resistor R29. Further, meanwhile, the transistor T42 in the current sensing circuit is made On and T41 is made On. Thereby, the capacitors C1 and C2 are charged to be proximate to voltages determined by R42 and R22. Iref-1 is set such that a value constituted by multiplying a total of reference currents at this occasion by n times becomes larger than the motor rush current. That is, Iref-1 is set such that a relationship of Eq. (19) is established.

$$\text{ID rush current maximum value} < n*(Iref\text{-}s+Iref\text{-}f+Iref\text{-}1) \quad \text{Eq. (19)}$$

Thereby, during a starting timer time period, the output level of CMP1 is at L level and therefore, the current flows through a path of the power source voltage VB→the transistor T41→the resistor R42→the diode D41→the diode D22→the resistor R22→the output of CMP1 and potentials of the capacitors C1 and C2 are represented by Eq. (20) and Eq. (21).

$$C1\text{ potential}=(VB\text{-}2*0.7V\text{-}CMP1\text{ output})*R22/(R42+R22)+0.7V+CMP1\text{ output} \quad \text{Eq. (20)}$$

$$C2\text{ potential}=(VB\text{-}2*0.7V\text{-}CMP1\text{ output})*R22/(R42+R22)+CMP1\text{ output} \quad \text{Eq. (21)}$$

The voltage drop in the forward direction of the diode is set to 0.7V. According to the circuit example, the power source voltage VB=12.5V, the CMP output L level=2V, R42=3KΩ, R22=5.1KΩ and therefore, the potential of C1=8.3V, the potential of C2=7.7V. When the starting timer is finished, T43, T41 are made Off. At this occasion, when the motor current is reduced and the output of CMP1 stays at L level, the electric charge of C1 and C2 is discharged through a path of the diode D22→the resistor R22→the output of CMP1 to immediately enter followup operation. Therefore, when jamming is brought about under the state, the motor can be stopped by immediately detecting jamming.

When the Motor is Not Rotated After Starting (Inputting the Window Up Signal)

In this case, at a time point of finishing the starting timer, a motor lock current is made to flow and therefore, the output of CMP1 becomes H level and the potential of C2 is immediately charged up to the output of H level of CMP1 via the resistor R22=5.1K. Meanwhile, the potential of C1 is hardly raised since C1 is charged by a long time constant.

Therefore, the minus input terminal voltage becomes higher than the plus input terminal voltage of CMP2 and the output of CMP2 becomes L level. Even when T1 carries out the On/Off operation, the continuous On is not carried out thereby and therefore, jamming determination is immediately carried out and reversely rotating operation is carried out.

Even when the motor is rotated after starting, in the case in which the output of CMP1 is at H level at a time of finishing the starting timer, the On/Off operation is immediately started. When the motor current ID is reduced during the time period of continuing the On/Off operation and the continuous On operation, the motor is started to be operated normally to continue rotating and when the motor current is increased by jamming, jamming is determined and the motor is operated rotate reversely, it is necessary to set R41, R22 such that the motor is not rotated reversely although jamming is not brought about.

Although according to the above-described power window jamming preventing apparatus and other embodiment and modified examples disclosed in JP-A-2002-295129, the motor current can be restricted by swiftly determining jamming of a foreign matter without erroneous recognition, it is further preferable to promote a function of preventing erroneous reverse rotation of the power-window motor particularly when the voltage is low (that is, when the power source voltage supplied from the power source supply apparatus is low).

SUMMARY OF THE INVENTION

The present invention has been made in light of the above circumstances, and it is an object of the present invention to provide an improved power-window jamming preventing apparatus capable of limiting a motor current by sensing surely an abnormal current caused in a motor current due to a jamming of a foreign matter without error in the power-window jamming preventing apparatus that can sense the jamming of the foreign matter in a window glass based on change in the motor current.

In order to achieve the above object, according to the present invention, there is provided a power-window jamming preventing apparatus, comprising:

a current sensing circuit, which senses a motor current flowing through a motor for driving a window glass;

a current limiting circuit, which increases and decreases the motor current based on a current-limitation control signal outputted from the current sensing circuit when an amount of increase of the motor current exceeds a predetermined vale; and a jamming determining circuit, which determines a jamming of a foreign matter in the window glass based on increase of the motor current to reverse a rotation of the motor, wherein the current sensing circuit includes;

a shunt resistor, on which the motor current is flown;

a reference resistor, which has a resistance value that is n times the shunt resistor; and a current following circuit, which increases and decreases a reference current that flows through the reference resistor and is 1/n of the motor current, based on a voltage applied to the shunt resistor;

wherein the current following circuit includes:

a reference current controlling circuit, which controls increase/decrease of the reference current, and generates a first reference voltage which is lowered according to increase of the motor current, and a second reference voltage which is higher than the first reference voltage, based on the reference current;

a first comparator, which has a first input terminal to which the first reference voltage is applied; and a charging/discharging circuit, which generates a third reference voltage in compliance with a charge/discharge controlling signal outputted from the first comparator and outputs the third reference voltage to a second input terminal of the first comparator, the third reference voltage indicating an average value of the first reference voltage, and the charge/discharge controlling signal being shifted alternately to two voltage levels, and the apparatus, further comprising a potential difference generating circuit, which monitors a power source voltage supplied to the current sensing circuit and the power window motor, and which clamps the third reference voltage so as to drop a constant voltage from the third reference when the power source is low such that a potential difference between the second reference voltage and the third reference voltage is kept greater than a predetermined voltage.

According to the above configuration, the potential difference generating circuit of the power window jamming preventing apparatus monitors the power source voltage supplied to the current sensing circuit and the power window motor and clamps the third reference voltage when the power source voltage is low to always subject to the constant voltage drop, thereby, the potential difference between the second difference voltage and the third difference voltage is prevented from being equal to or lower than the predetermined voltage and therefore, in comparison with the power window jamming preventing apparatus of the prior art, there is promoted the function of preventing the power window motor from being erroneously rotated reversely when the power source voltage is a low voltage. Further, a value of the voltage drop of the third reference voltage by the potential difference generating circuit is to be set such that the second reference voltage is equal to or lower than the third reference voltage when jamming is brought about and by setting in this way, even immediately after starting the power window motor, when jamming is brought about and the amount of increasing the motor current exceeds the predetermined value, the power window motor can swiftly and firmly be rotated reversely by swiftly and firmly reducing the motor current by the current restricting circuit and determining jamming without erroneous recognition from the increase in the motor current by the jamming determining circuit.

Preferably, the potential difference generating circuit includes: a power source voltage monitoring circuit, which monitors the power source voltage to determine whether or not the power source voltage is low, and which outputs a clamp circuit control signal based on a result of a determination of the power source voltage monitoring circuit; and a clamping circuit, which is provided in the charge/discharge circuit for clamping the third reference voltage so as to drop the constant voltage from the third reference in accordance with the clamping circuit control signal indicating that the power source voltage is low.

In the above configuration, there is promoted the function of preventing the power window motor from being erroneously rotated reversely when the power source voltage is the low voltage.

As described above, concise explanation has been given of the invention. Further, details of the invention will further be clarified by reading the best mode for carrying out the invention explained below in reference to the attached drawings.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
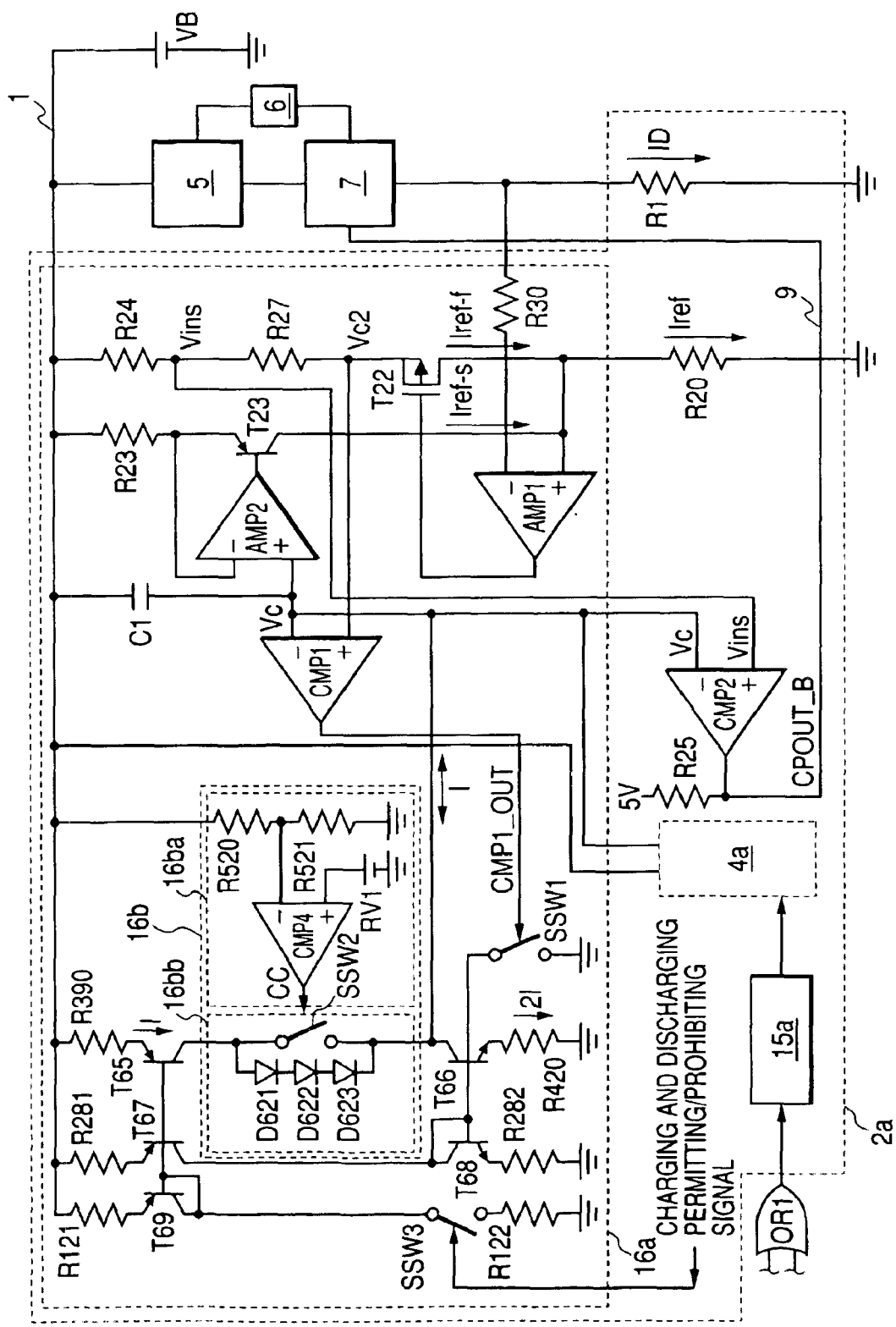
FIG. 1 is a circuit diagram schematically showing a power window jamming preventing apparatus which is an embodiment according to the invention.
Figure 2A:
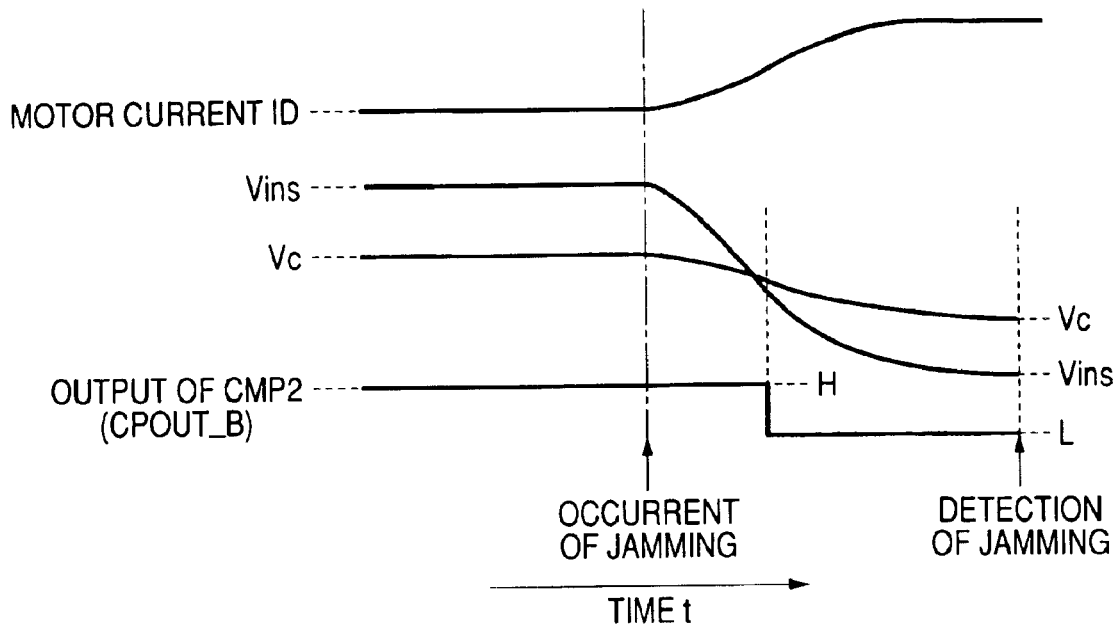
FIG. 2A is a characteristic diagram (timing chart) showing respective changes of a motor current, a second reference voltage, a third reference voltage and an output of a comparator CMP2 from occurrence of jamming in operating a power window to detection of jamming by the power window jamming preventing apparatus of FIG. 1
Figure 2B:
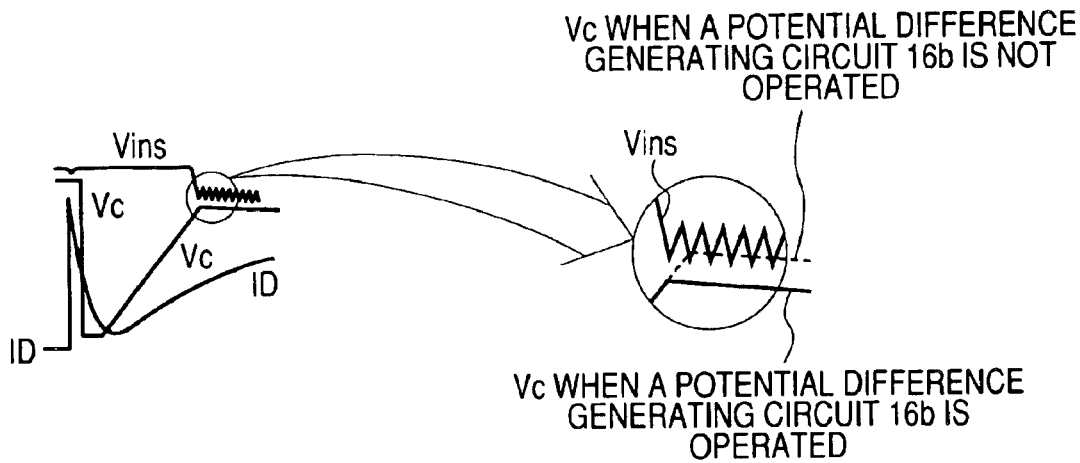
FIG. 2B is a characteristic diagram (timing chart) showing respective changes of the motor current, the second reference voltage and the third reference voltage of the power-window motor when a Vins–Vc potential difference generating circuit is operated in the power window jamming preventing apparatus of FIG. 1 and when the Vins–Vc potential difference generating circuit is not operated.
Figure 3:
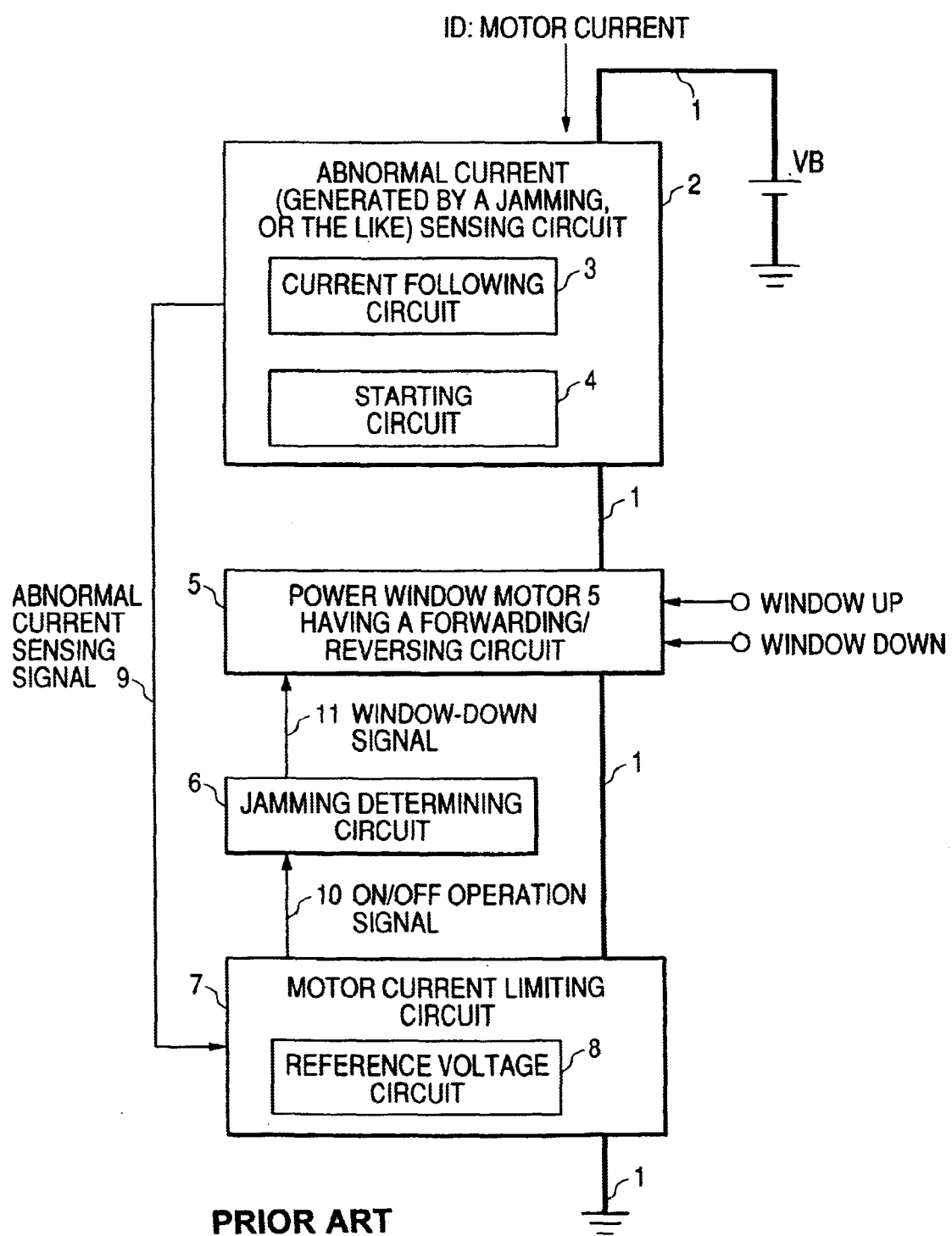
FIG. 3 is a block diagram of a power window jamming preventing apparatus of a related art.

A detailed explanation will be given of a preferable embodiment according to the invention in reference to the attached drawings as follows. FIG. 1 is a circuit diagram schematically showing a power window jamming preventing apparatus which is an embodiment according to the invention, FIG. 2A is a characteristic diagram (timing chart) showing respective changes of the motor current ID, the second reference voltage Vins, the third reference voltage Vc, and the output (CPOUT_B) of the comparator CMP2 reaching detection of jamming by the power window jamming preventing apparatus of FIG. 1 from occurrence of jamming in operating the power window, and FIG. 2B is a characteristic diagram (timing chart) showing respective changes of the motor current ID, the second reference voltage Vins and the third reference voltage Vc after starting the power-window motor 5 when a Vins–Vc potential difference generating circuit 16b is operated in the power window jamming preventing apparatus of FIG. 1 and when the Vins–Vc potential difference generating circuit 16b is not operated.

Figure 4A:
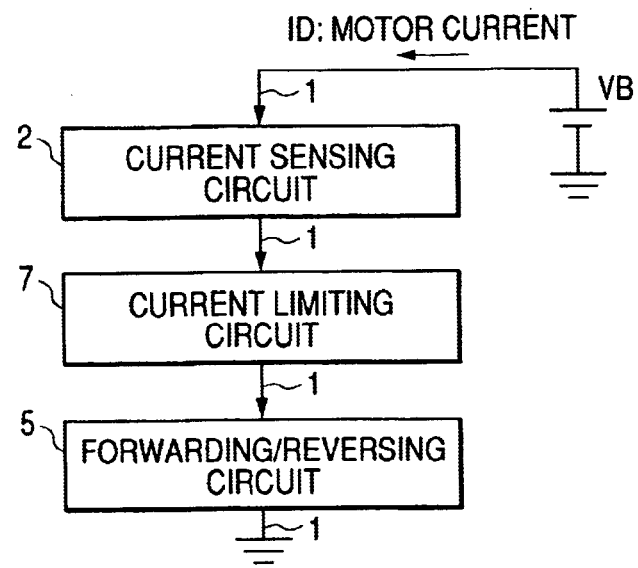
FIGS. 4A to 4C illustrate block diagrams for explaining modified examples of the power window jamming preventing apparatus of the related art.
Figure 4B:
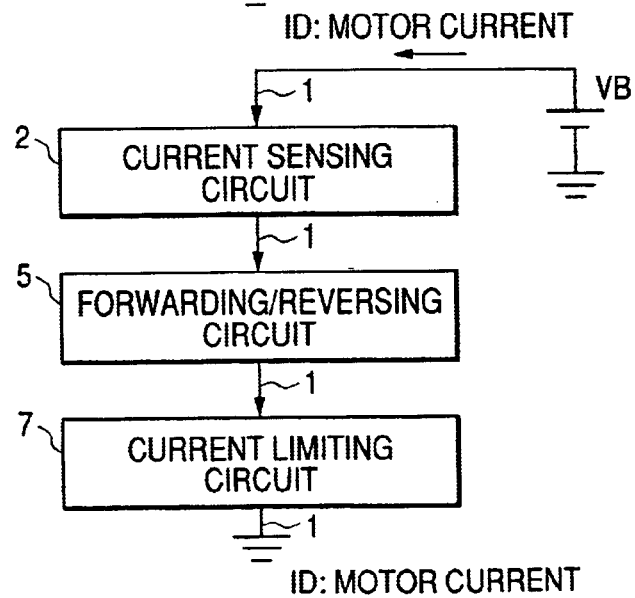
Figure 4C:
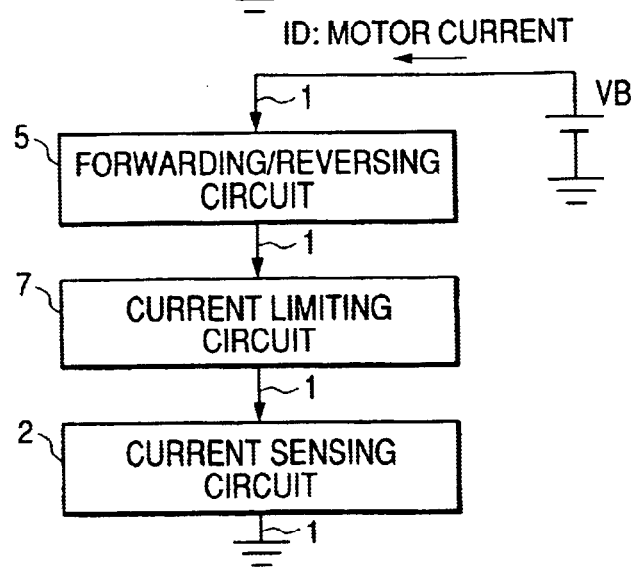
Figure 5:
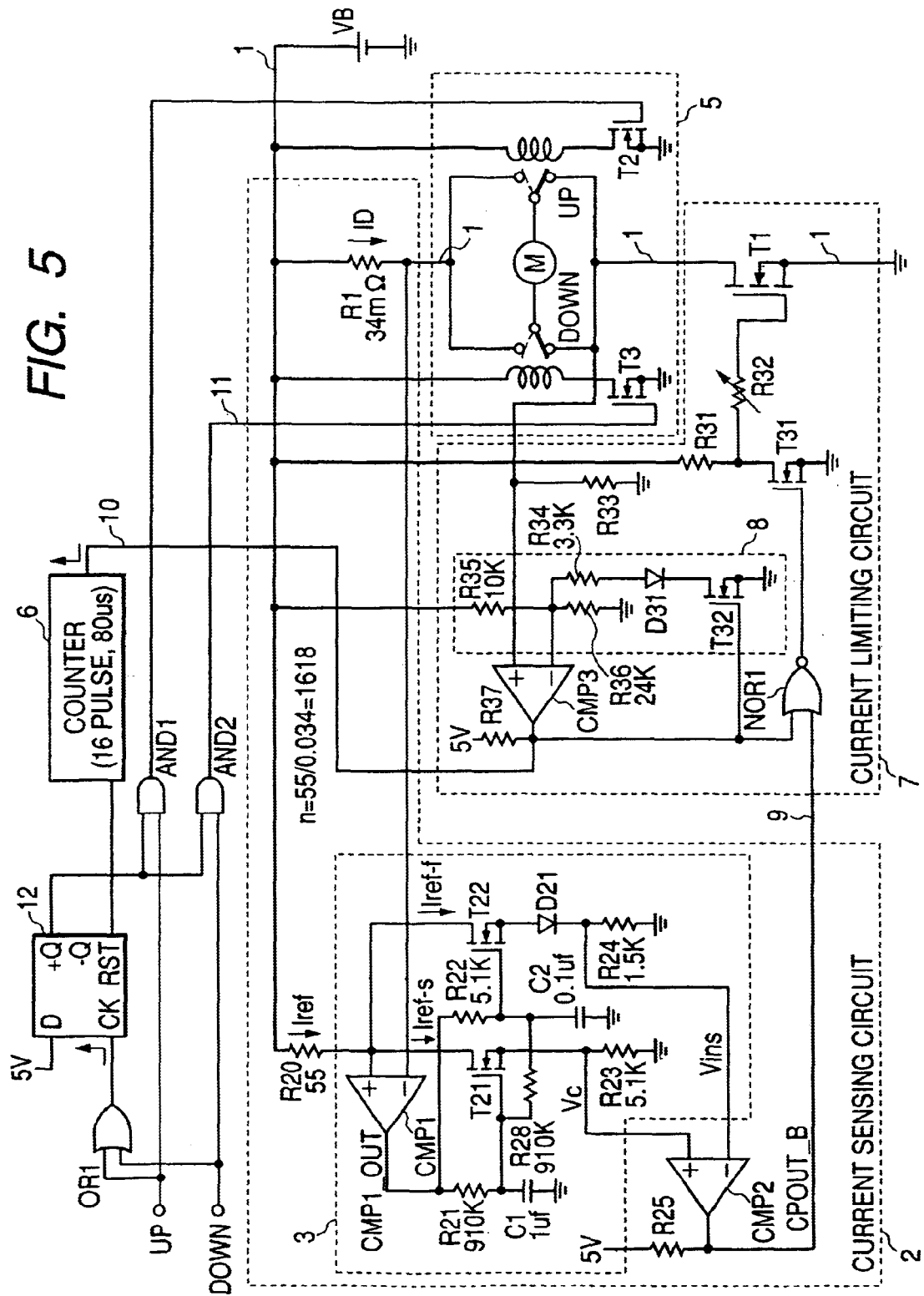
FIG. 5 is a circuit diagram of the power window jamming preventing apparatus of the related art.
Figure 6A:
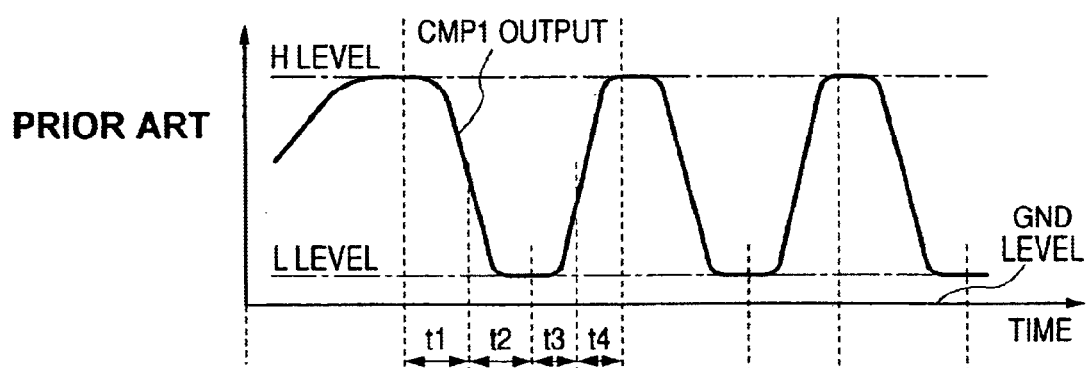
FIGS. 6A to 6C illustrate diagrams for explaining Onoff operation of a current sensing circuit of the power window jamming preventing apparatus of the related art.
Figure 6B:
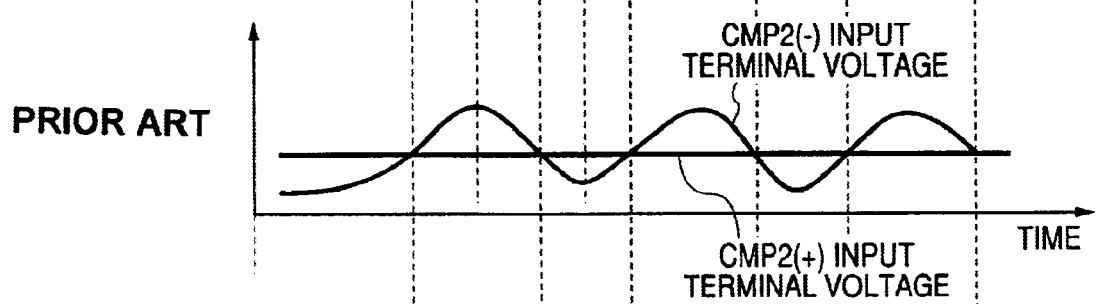
Figure 6C:
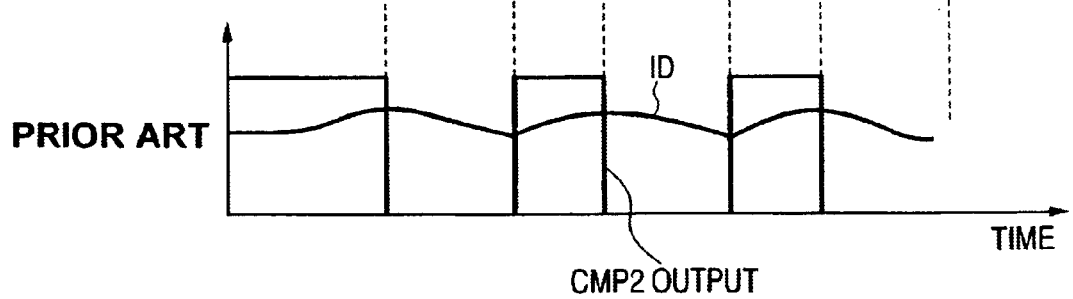
Figure 7:
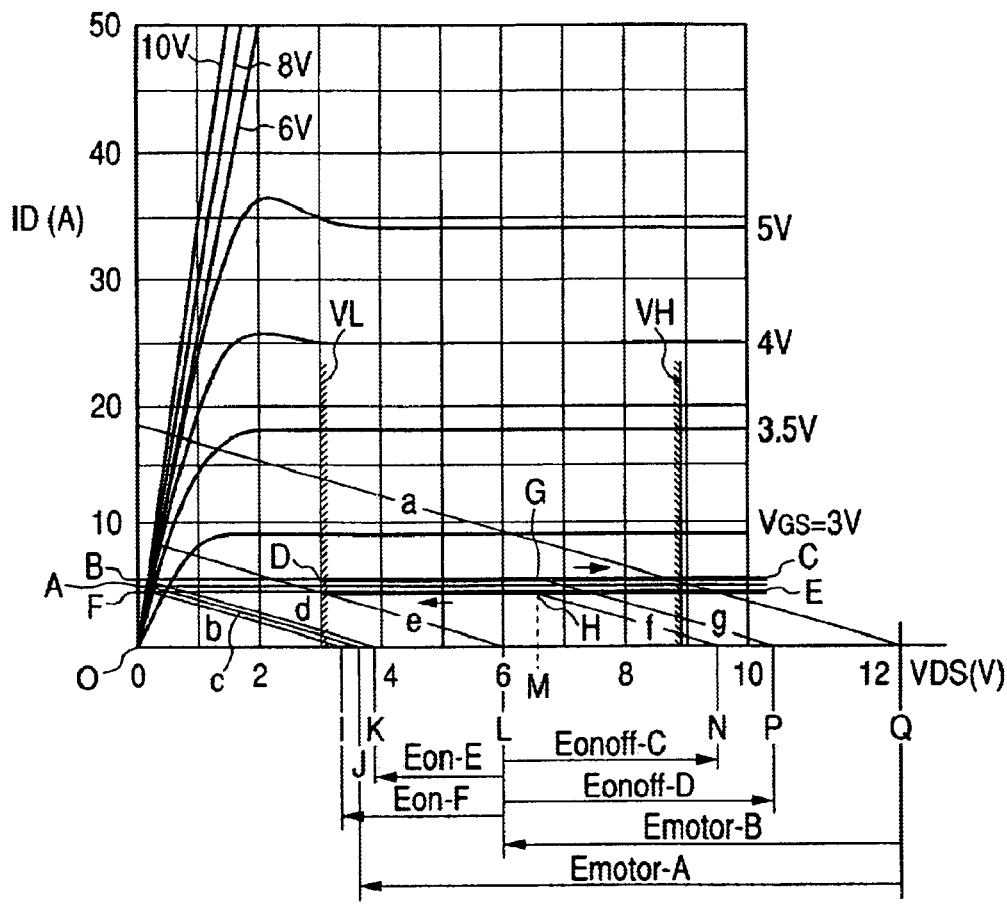
FIG. 7 is a static characteristic curve diagram added with a load line for explaining operation of a semiconductor switching element of a current limiting circuit of the power window jamming preventing apparatus of the related art.
Figure 8:
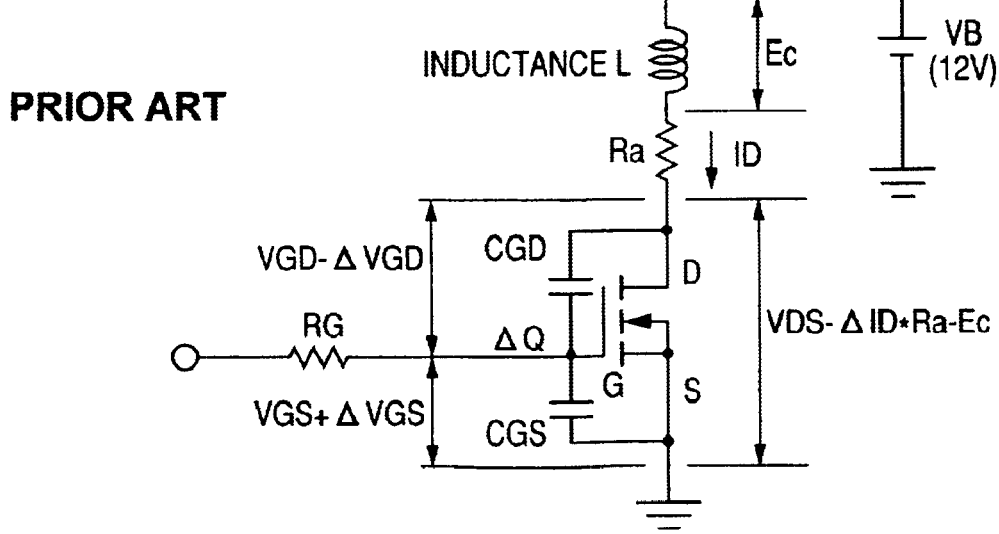
FIG. 8 is an equivalent circuit diagram for explaining operation of the semiconductor switching element of the current limiting circuit of the power window jamming preventing apparatus of the related art.
Figure 9:
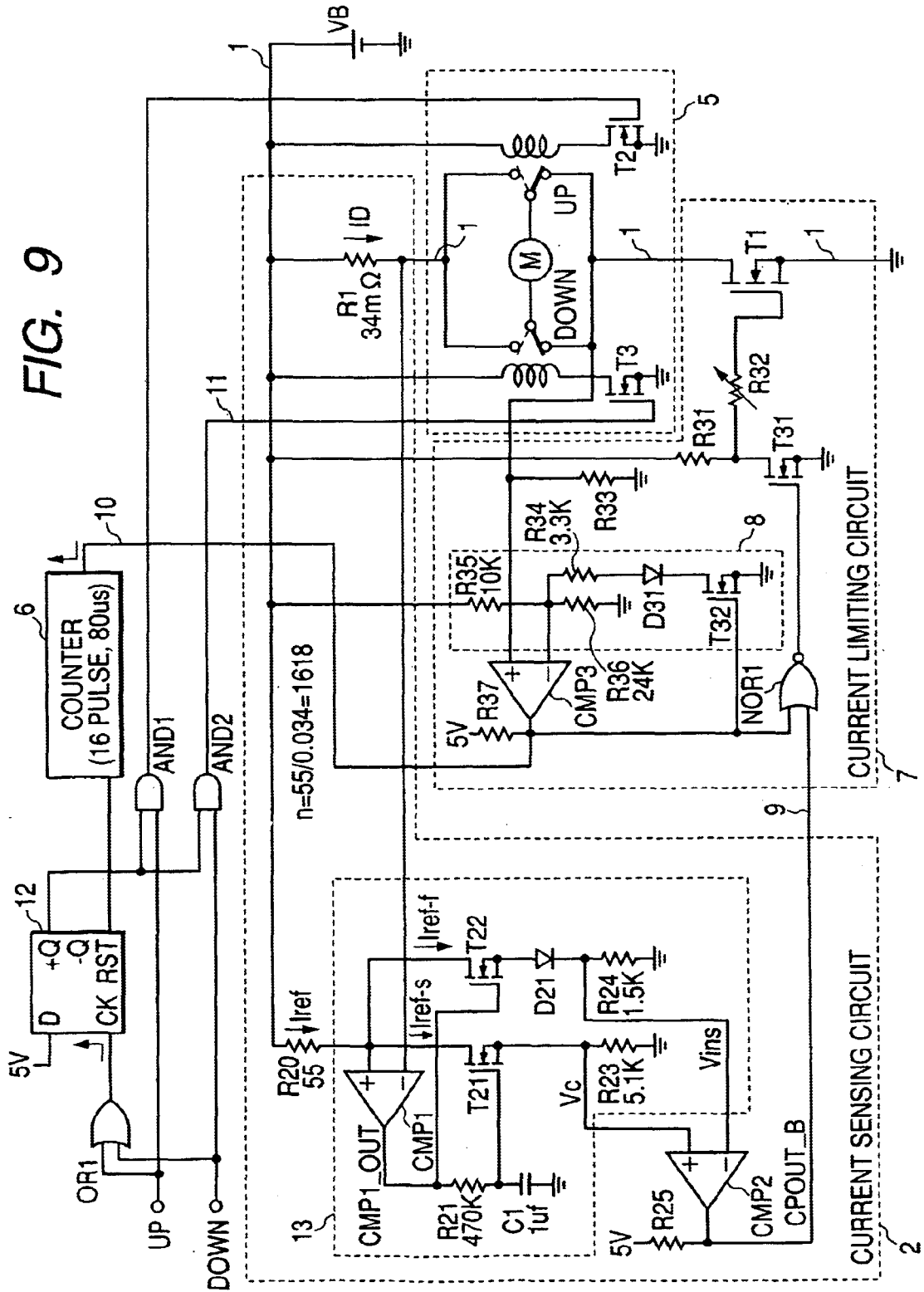
FIG. 9 is a circuit diagram showing a modified example of the power window jamming preventing apparatus of FIG. 5.
Figure 10:
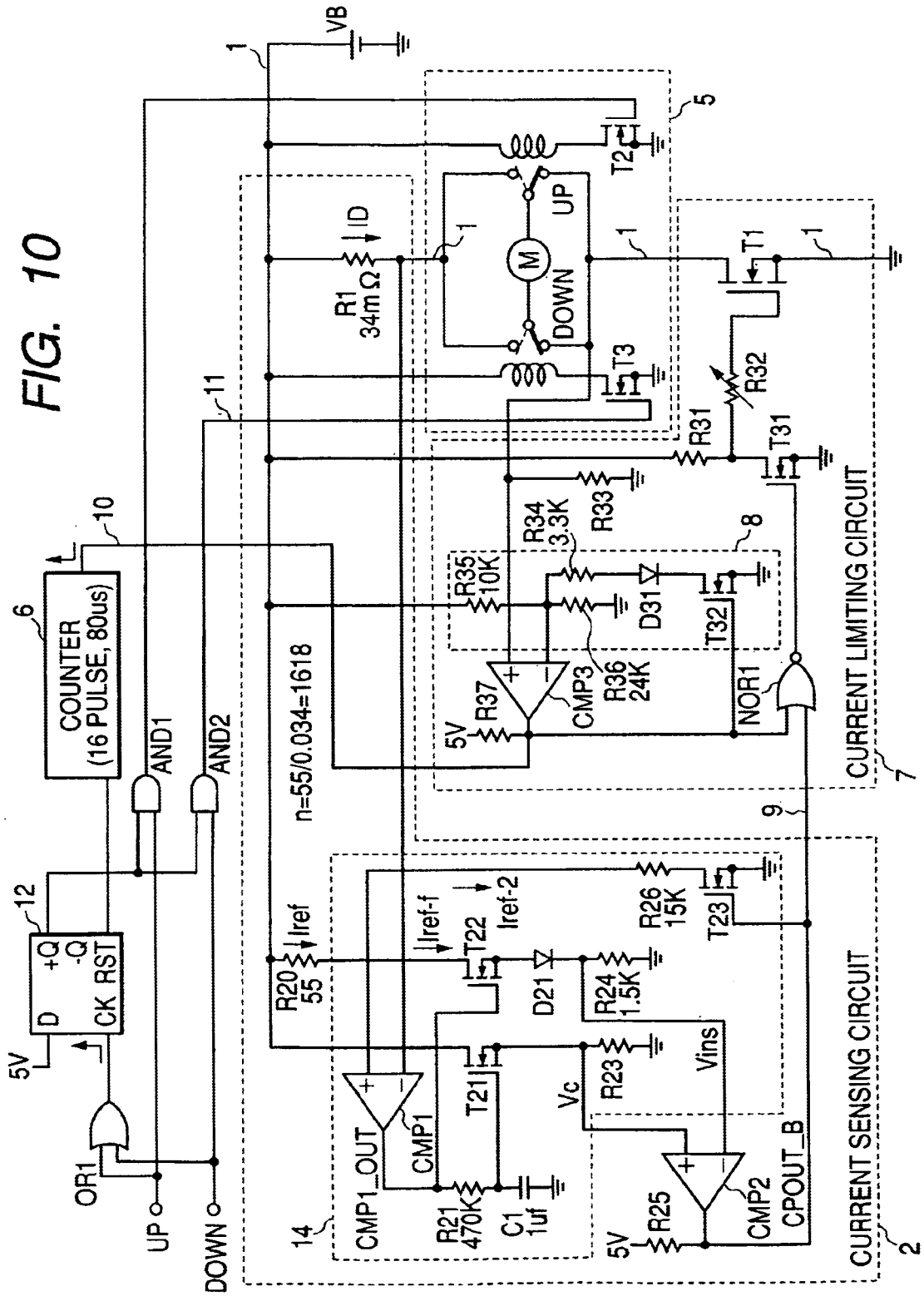
FIG. 10 is a circuit diagram showing a modified example of the power window jamming preventing apparatus of FIG. 9.
Figure 11:
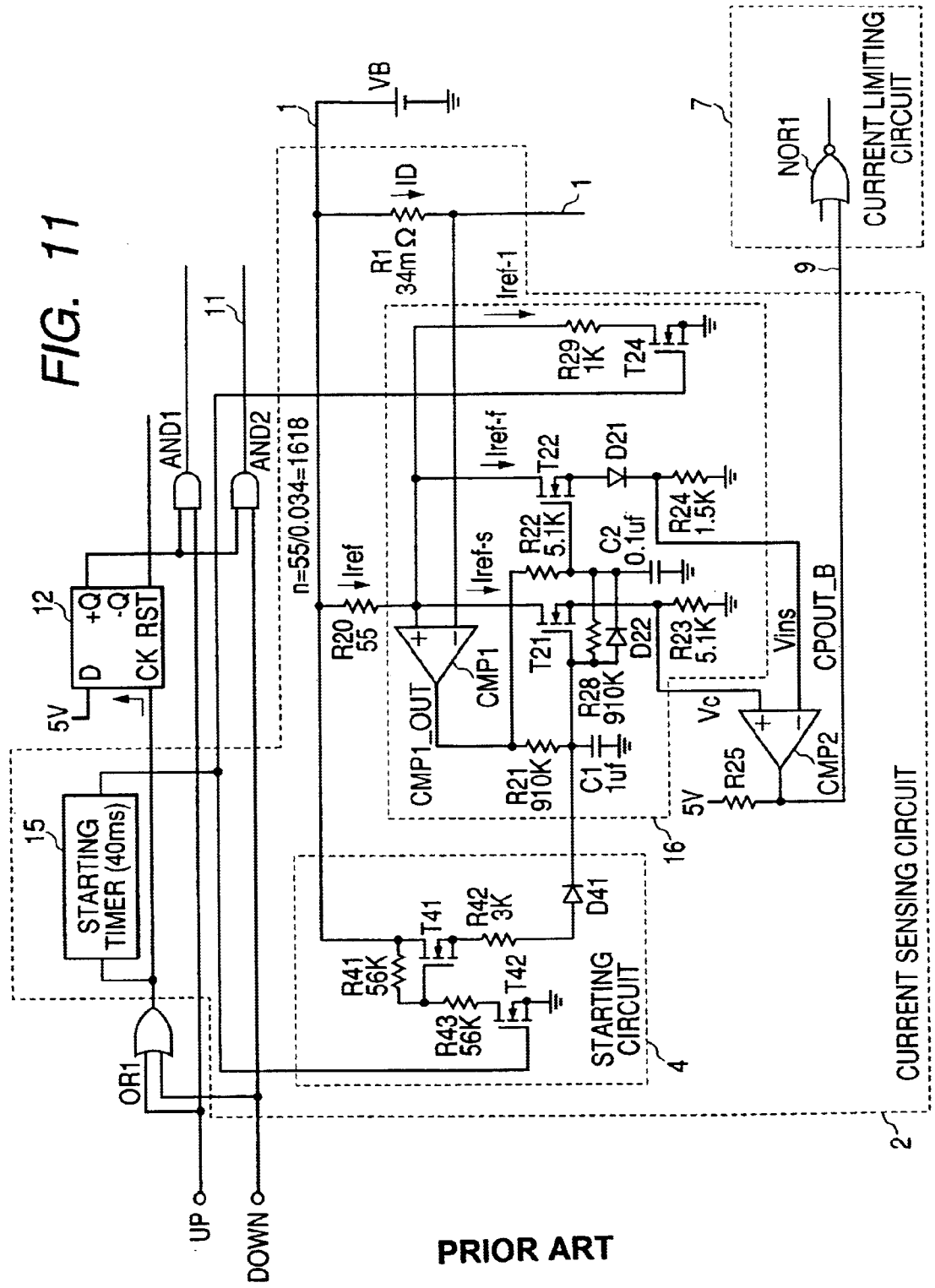
FIG. 11 is a circuit diagram showing a modified example of the power window jamming preventing apparatus of FIG. 5.

The power window jamming preventing apparatus of the invention show in FIG. 1 is provided with an example of a circuit modifying the power window jamming preventing apparatus of FIG. 5 as shown by FIG. 4C and FIG. 11 as has already been explained and modifying the power window jamming preventing apparatus by using a resistor in place of the diode D21 of the current sensing circuit 2. Specifically, according to the power window jamming preventing apparatus of the invention, the shunt resistor R1 and the reference resistor R20 of the current sensing circuit are arranged on the low side (that is, ground side) of the power-window motor 5 and the circuit constitution of the current following circuit of the current sensing circuit is changed in accordance therewith.

As shown by FIG. 1, the power window jamming preventing apparatus of the invention includes a current sensing circuit 2a for detecting an increase in the motor current ID flowing in the power-window motor 5 having the regularly rotating and reversely rotating circuit, the current limiting circuit 7 for reducing and increasing the motor current ID in a predetermined range in accordance with the current restricting control signal CPOUT_B outputted from the current sensing circuit 2a when the amount of increasing the motor current ID exceeds a predetermined value, and the jamming determining circuit 6 connected to the current limiting circuit 7 and the power-window motor 5 for determining jamming from the increase in the motor current ID. Further, constitutions of the power-window motor 5, the jamming determining circuit 6 and the current limiting circuit 7 are substantially the same as the circuit constitutions of the power window jamming preventing apparatus of FIG. 5.

The current sensing circuit 2a includes the shunt resistor R1 which is connected in series with the power-window motor 5 and the current limiting circuit 7, one end of which is connected to the minus terminal (that is, ground terminal; ground) of the power supply device VB and in which the motor current ID is made to flow from the power supply device VB, the reference resistor 20 which is provided with the resistance value of n times of that of the shunt resistor R1 and one end of which is connected to the minus terminal of the power supply device VB, a current following circuit 16a connected to respective other ends of the reference resistor R20 and the shunt resistor R1 for increasing and reducing the reference current Iref flowing to the reference resistor R20 based on the voltage applied to the shunt resistor R1, the comparator (second comparator) CMP2 the plus input terminal and the minus input terminal of which are connected to the current following circuit 16a and the output terminal of which is connected to MOR1 (refer to FIG. 5) of the current limiting circuit 7, the resistor R25 connected between the 5V power source and the output terminal of CMP2 for pulling up the current-limitation control signal CPOUT_B, a starting circuit 4a connected to the current following circuit 16a for providing the rush current masking time period such that the On/Off operation is not carried out by the rise current (that is, rush current) of the motor current ID in starting the power-window motor 5, a starting timer 15a connected to the starting circuit 14a and connected to an output terminal of an OR circuit OR1 for calculating a logical sum of H/L level of the window down signal (Down) and the window up signal (Up) for instructing to open and close the window glass. Further, the starting timer 15*a* may not be provided as a constituent element of the current sensing circuit 2*a*.

The current following circuit 16*a* includes a reference current control circuit for controlling to increase or reduce a reference current constituting 1 n-th of the motor current ID. The reference current control circuit includes a resistor R24 one end of which is connected to the wire 1, a resistor R27 one end of which is connected to other end of the resistor R24 and a line connecting to the resistor R24 of which is connected with the plus input terminal of CMP2, pMOSFET T22 provided between the resistor R27 and the reference resistor R20 such that a drain terminal thereof is connected to other end of the resistor 27 and a source terminal of which is connected to other end of the reference resistor R20, an operational amplifier AMP1 a plus input terminal of which is connected to a source terminal of T22 and an output terminal of which is connected to a gate terminal of T22, a resistor of R30 one end of which is connected to a minus input terminal of the operational amplifier AMP1 and other end of which is connected to the other end of the resistor R1, a resistor R23 one end of which is connected to the wire 1, a PNP type bipolar transistor T23 an emitter terminal of which is connected to other end of the resistor R23 and a collector terminal of which is connected to the source terminal of T22, and an operational amplifier AMP2 a minus input terminal of which is connected to the emitter terminal of T23, an output terminal of which is connected to a base terminal of T23 and a plus input terminal of which is connected to a minus input terminal of CMP2.

The operational amplifier AMP1 applies a pertinent voltage from the output terminal to the gate terminal of T22 to control such that the current Iref-f is made to flow from T22 to the reference resistor R20 in accordance with an increase or a reduction in the motor current ID flowing to the shunt resistor R1. According to the control, when the motor current ID is increased, an input terminal voltage of AMP1 is instantaneously increased and therefore, the voltage applied from AMP1 to the gate terminal of T22 is increased to make the current Iref-f flow to increase and conversely when the motor current ID is reduced, the input terminal voltage of AMP1 is instantaneously reduced and therefore, the voltage applied from AMP1 to the gate terminal of T22 is reduced to make the current Iref-f flow to reduce. Further, although the resistor R30 is provided between the minus input terminal AMP1 and the shunt resistor R1, the resistor R30 is a resistor for adjusting an input impedance of AMP1 and may not be provided. When the resistor R30 is not provided, the reference current Iref is made to flow to the reference resistor R20 such that voltages respectively applied to the shunt resistor R1 and the reference resistor R20 are always equal to each other.

The current following circuit 16*a* is further provided with the first comparator CMP1 the minus input terminal of which is connected to the plus input terminal of the operational amplifier AMP2 and the plus input terminal of which is connected to the drain terminal of T22 (that is, the other end of the resistor R27), and a charging and discharging circuit. The charging and discharging circuit includes a capacitor C1 one end of which is connected to the wire 1 and other end of which is connected to the minus input terminal of AMP1, a resistor R390 one end of which is connected to the wire 1, a PNP type bipolar transistor T65 an emitter terminal of which is connected to the other end of the resistor R390, a Vins–Vc potential difference generating circuit 16*b* connected to a collector terminal of T65, an NPN type bipolar transistor T66 a collector terminal of which is connected to the Vins–Vc potential difference generating circuit 16*b* and the minus input terminal of CMP1 (otherwise, the other end of C1 and the like), a first semiconductor switch SSW1 connected between a base terminal of T66 and the minus terminal of the power supply device VB and connected to the output terminal of CMP1 for being operated to On/Off in accordance with the output of CMP1 (CMP1_OUT), a resistor R420 one end of which is connected to an emitter terminal of T66 and other end of which is connected to the minus terminal of the power supply device VB, a resistor R281 one end of which is connected to the wire 1, a PNP type bipolar transistor T67 an emitter terminal of which is connected to other end of the resistor R281 and a base terminal of which is connected to a base terminal of T65, an NPN type bipolar transistor T68 a collector terminal and a base terminal of which are connected to a collector terminal of T67 and a base terminal of T66, a resistor R282 one end of which is connected to an emitter terminal of T68 and other end of which is connected to the minus terminal of the power supply device VB, a resistor R121 one end of which is connected to the wire 1, a PNP type bipolar transistor T69 an emitter terminal of which is connected to other end of the resistor R121 and a base terminal and a collector terminal of which are connected to a base terminal T67, a third semiconductor switch SSW3 one end of which is connected to the collector terminal of T69 for being operated On/Off in accordance with charging and discharging permitting/prohibiting signals outputted from a control apparatus (not illustrated), a resistor R122 one end of which is connected to other end of SSW3 and other end of which is connected to the minus terminal of the power supply device VB. Further, in a normal state (that is, when the capacitor C1 is permitted to charge and discharge), the semiconductor switch SSW3 is brought into an On state in accordance with the charging and discharging permitting/prohibiting signals to shortcircuit the circuit, thereby, the base terminal voltage of T69 is reduced and a current is made to flow from the resistor R121 (wire 1) to the resistor R122 (the minus terminal of the power supply device VB).

The Vins–Vc potential difference generating circuit 16*b* includes a power source voltage monitoring circuit 16*ba* connected to the wire 1 and the monitoring the power source voltage VB, and a clamping circuit 16*bb* connected between the collector terminal of T65 and the collector terminal of T66. The power source voltage monitoring circuit 16*ba* includes a resistor R520 one end of which is connected to the wire 1, a resistor 521 one end of which is connected to other end of the resistor R520 and other end of which is connected to the minus terminal of the power supply device VB, a third comparator CMP4 a minus input terminal of which is connected to a connecting line of R520 and R521, and a reference voltage source RV1 connected between a plus input terminal of CMP4 and the minus terminal of the power supply device VB and applying a reference voltage to the plus input terminal of CMP4. Further, the power source voltage monitoring circuit 16*ba* may not be provided as a constituent element of the current following circuit 16*a*. Meanwhile, the clamping circuit 16*bb* includes a second semiconductor switch SSW2 connected between the collector terminal of T65 and the collector terminal of T66 and connected to an output terminal of CMP4 for being operated to On/Off in accordance with an output (CC) of CMP4, and a series of three diodes D621, D622, D623 connected in parallel with SSW2. According to the series of three diodes D621, D622, D623, in further details, an anode terminal of D621 is connected to the collector terminal of T65, an anode terminal of D622 is connected to a cathode terminal of D621, an anode terminal of D623 is connected to a cathode terminal of D622 and a cathode terminal of D623 is connected to the collector terminal of T66. The diodes D621, D622, D623 connected in series in this way are for producing a desired potential difference (a potential difference of 2.1V when a forward direction voltage drop of one diode is, for example, 0.7V) between the collector terminal of T65 and the collector terminal of T66 by forward direction voltage drops thereof. In this way, according to the embodiment, three of voltage drop circuits (that is, D621, D622 and D623) are provided, however, a number of these is pertinently selected in accordance with the desired potential difference. Further, resistors or the like may naturally be used as voltage drop circuits in place of the diodes D621, D622, D623.

According to the current following circuit 16a, the first reference voltage Vc2 which is a potential of the drain terminal of T22 (that is, the other end of the resistor R27) is inputted to the plus input terminal of the comparator CMP1. Further, the second reference voltage Vins applied to the plus input terminal of CMP2 shows a voltage value higher than that of Vc2 by an amount of the resistor R27. Further, the third reference voltage Vc controlled to constitute the average value of Vc2 is generated by charging and discharging the capacitor C1 and applied to the minus input terminal of CMP1 and the minus input terminal of CMP2. Vc2, Vins and Vc are generated by passing the reference current Iref through a reference current control circuit and a difference between Vc and Vc2 is made to be proportional to a difference between Vc and Vins.

According to the operational amplifier AMP2, a current value of the current Iref-s is constituted by dividing a voltage applied across both ends of the resistor R23 (that is, a difference voltage between a potential of the wire 1 and Vc) by a resistance value of R23 and therefore, T23 is controlled such that the current Iref-s is made to flow to the resistor R23 by applying a pertinent voltage to the base terminal of T23 from the output terminal. According to the control, when the motor current ID is increased, the input terminal voltage (Vc) is reduced by being delayed mainly by charging and discharging the capacitor C1 and therefore, the voltage applied from AMP2 to the base terminal of T23 is slowly reduced to make the current Iref-s flow to increase and conversely, when the motor current ID is reduced, the input terminal voltage (Vc) of AMP2 is increased by being delayed mainly by charging and discharging the capacitor C1 and therefore, the voltage applied from AMP2 from the base terminal of T23 is slowly increased to reduce the current Iref-s.

Further, the reference current Iref flowing in the reference resistor R20 is a total of the current Iref-f flowing through the resistor R24 and the resistor R27 and the current Iref-s flowing through the resistor R23 and is a current in correspondence with one several thousandth through several tens thousandth of the motor current ID similar to the case of the circuit constitution of FIG. 11 and is pulsated similar to the motor current ID. Notation Vins designates a potential between the resistor R24 and the resistor R27, and a potential the voltage of which is dropped from Vins by a certain value by the resistor R27 and therefore, Vc2 is also pulsated similar to Vins. However, pulsating waveforms of Vins and Vc2 are naturally reverse to a pulsating waveform of the motor current ID.

As described above, according to the charging and discharging circuit, when SSW 3 is brought into an ON state, operation of charging and discharging the capacitor C1 is permitted. Specifically, first, when the circuit is shortcircuited by SSW3, the base terminal voltage of T69 is reduced and T69 is brought into an ON state. Further, since the base terminal voltage of T67 is the same as the base (collector) terminal voltage of T69, T67 is brought into an On state, thereby, the base terminal voltage of T68 is increased and T68 is brought into an On state (when SSW1 is brought into an Off state and the circuit is opened) and the current is made to flow from the resistor R281 (wire 1) to R282 (the minus terminal of the power supply device VB). Meanwhile, since the base terminal voltage of T65 is the same as the respective base terminal voltages of T67 and T69, T65 is also brought into an On state, further, since the base terminal voltage of T66 is the same as the base (collector) terminal voltage of T68 (when SSW1 is brought into the Off state and the circuit is opened), T66 is also brought into an On state. According to the power source voltage monitoring circuit 16ba, a voltage having a value constituted by dividing the power source voltage VB (the voltage applied to the wire 1 by the power supply device VB) by the resistor R520 and the resistor R521 is applied to the minus input terminal of CMP4, the voltage is compared with the reference voltage applied to the plus input terminal of CMP4 (outputted from the reference voltage source RV1) at CMP4, when the voltage is equal to or higher than the reference voltage, the clamping circuit control signal (CC) at H level is outputted from the output terminal of CMP4, SSW2 is brought into an On state and the circuit is shortcircuited, further, when the voltage is equal to or lower than the reference voltage, the clamping circuit control signal (CC) at L level is outputted from the output terminal of CMP4, SSW2 is brought into an Off state and the circuit is opened.

When a pulsating voltage of Vc2 is equal to or higher than Vc, CMP1 outputs the charging and discharging control signal (CMP1_OUT) at H level and outputs the charging an discharging control signal (CMP1_OUT) at L level when VC2 is equal to or lower than Vc. In this way, CMP1 outputs the charging and discharging control signal (CMP1_OUT) alternately changing the two voltage levels. When the semiconductor switch SSW 1 receives CMP1-OUT at H level from CMP1, the circuit is shortcircuited and T66 is brought into the Off state, a current I is made to flow from the wire 1 to the capacitor C1 via R390, T65 and the clamping circuit 16bb to charge the capacitor C1. At this occasion, when SSW2 is brought into the On state, Vc becomes equal to the value of the collector terminal voltage of T65 (T66), and when SSW2 is brought into the Off state, Vc becomes equal to the value of the collector terminal voltage of T66 the voltage of which is dropped from the collector terminal voltage of T65 by the series of three diodes D621, D622, D623 (the case of the embodiment). Meanwhile, when the semiconductor switch SSW1 receives CMP1_OUT at L level from CMP1, the circuit is opened and T66 is brought into the On state, a current 2I twice as much as the current I is made to flow from T66 and the resistor R420 to the ground (that is, the current I is made to flow from the wire 1 via R390, T65 and the clamping circuit BB and the current I is made to flow also from the capacitor C1) and the capacitor C1 is discharged. IN this way, in the charging and discharging circuit, the stable reference voltage Vc is generated by charging and discharging the capacitor C1 and is controlled to follow Vins.

According to the power window jamming preventing apparatus of FIG. 1, as shown by FIG. 2A, when jamming is brought about in operating to move up the window glass and the motor current ID is rapidly increased, the plus input terminal voltage (Vins) of CMP2 indicating an instantaneous value of the motor current ID is lowered, and also the minus input terminal voltage (Vc) is slowly lowered by retardedly following lowering of Vins by charging and discharging the capacitor C1. Further, Vins and Vc cross each other (that is, the potential of Vins becomes equal to or lower than the potential of Vc) and during the crossing time period, the output of CMP2 (CPOUT_B) is changed from H level to L level. Further, when CPOUT_B becomes L level, the semiconductor switching element T1 (refer to FIG. 5) is controlled to On/Off in the current limiting circuit 7, the number of times of On/Off during the On/Off operation time period is counted by the jamming determining circuit 6 based on the number of times of rise of the output level of CMP3 (refer to FIG. 5) of the current limiting circuit 7 and when the counted number reaches a constant value (for example, 16 pulses), jamming is determined.

According to the power window jamming preventing apparatus of FIG. 1, at low voltage time (when the power source voltage VB is low), a peak value of the pulsating voltage of Vins becomes high and therefore, an interval (that is, potential difference) between Vins and Vc becomes small. The potential difference characteristic of Vins and Vc is significantly indicated particularly at low temperature since a peak value of the pulsating current of the motor current ID becomes high. Hence, the power window jamming preventing apparatus of FIG. 1 is provided with the Vins–Vc potential difference generating circuit 16b for clamping Vc by the voltage dropping circuit (diodes (the case of the embodiment), resistors or the like) to provide the potential difference between Vins and Vc such that the potential difference between Vins and Vc does not become equal to or lower than a certain predetermined voltage in low voltage time. Here, an explanation will be given in reference to FIG. 2B showing respective changes of the motor current ID, the second reference voltage Vins and the third reference voltage Vc after starting the power-window motor 5 when the Vins–Vc potential difference generating circuit 16b is operated at the low voltage time and when the Vins–Vc potential difference generating circuit 16b is not operated (that is, SSW2 is always brought into the On state).

As shown by FIG. 2B, first, in starting the power-window motor 5, a rush current (motor current ID) is produced, however, the starting circuit 4a stabilizes Vc by carrying out a masking process of Vc in accordance with the control signal from the starting timer 15a such that an influence is not effected from the rapid change in the motor current ID. At this occasion, the voltage applied from AMP1 to the gate terminal of T22 stays to be under the low state (that is, T22 continues to be Off by setting a threshold of AMP1 in this way), Vins (as well as Vc2) are maintained at constant values and therefore, Vc and Vins similarly maintained at the constant values and do not cross each other. Further, when the masking time period of carrying out the masking process by the starting circuit 4a is finished, Vc is rapidly increased to be proximate to Vins and follows Vins when normal. However, when the power source voltage VB is low, the peak value of the pulsating voltage of Vins becomes high and therefore, the pertinent potential difference between Vins and Vc is not provided and when the Vins–Vc potential difference generating circuit 16b is not operated, as shown by a dotted line in FIG. 2B, although the jamming is not brought about, Vc crosses Vins, as a result, the power-window motor 5 is erroneously rotated reversely. Meanwhile, in a state that the Vins–Vc potential difference generating circuit 16b is operated, when the power source voltage Vb is lower than the predetermined voltage, the clamping circuit control signal (CC) for always subjecting Vc to the constant voltage drop by the diodes D621, D622, D623 (the case of the embodiment) by turning Off SSW2 of the clamping circuit 16bb is outputted from CMP4 of the power source voltage monitoring circuit 16ba, and therefore, as shown by a bold line of FIG. 2B, Vc follows Vins by providing the pertinent potential difference. Further, the operation of clamping Vc by the clamping circuit 16bb is continued during a time period in which the power source voltage monitoring circuit 16ba determines the power source voltage Vb as the low voltage. Further, when jamming is operated in the clamping operation, as shown by FIG. 2A, Vins and Vc cross each other to detect jamming. Therefore, the clamping of voltage of Vc by the clamping circuit 16bb, in other words, the forward direction voltage drop by the diodes D621, D622, D623 (the case of the embodiment) is to be set to a value by which Vins and Vc can cross each other when jamming is brought about.

In this way, according to the power window jamming preventing apparatus, at low voltage time (that is, when the power source voltage supplied from the power supply device Vb is low), the power source voltage monitoring circuit 16ba determines the low voltage to control such that the potential difference between Vc and Vins does not become equal to or lower than a certain predetermined voltage (in other words, such that Vins does not become equal to or lower than Vc although jamming is not brought about) by clamping Vc by the clamping circuit 16bb and therefore, a function of preventing the power-window motor 5 from being erroneously rotated reversely is promoted in comparison with the power window jamming preventing apparatus of the prior art.

Further, the invention is not limited to the above-described embodiment but can pertinently be modified or improved. Other wise, modes, number, portions of arranging respective constituent elements and the like and numerical values, waveforms and the like in the above-described embodiment are arbitrary and not limited so far as the invention can be achieved thereby.

What is claimed is:

1. A power-window jamming preventing apparatus, comprising;
   a current sensing circuit, which senses a motor current flowing through a motor for driving a window glass;
   a current limiting circuit, which increases and decreases the motor current based on a current-limitation control signal outputted from the current sensing circuit when an amount of increase of the motor current exceeds a predetermined vale; and
   a jamming determining circuit, which determines a jamming of a foreign matter in the window glass based on increase of the motor current to reverse a rotation of the motor,
   wherein the current sensing circuit includes;
      a shunt resistor, on which the motor current is flown;
      a reference resistor, which has a resistance value that is n times the shunt resistor; and
      a current following circuit, which increases and decreases a reference current that flows through the reference resistor and is 1/n of the motor current, based on a voltage applied to the shunt resistor;
   wherein the current following circuit includes:
      a reference current controlling circuit, which controls increase/decrease of the reference current, and generates a first reference voltage which is lowered according to increase of the motor current, and a second reference voltage which is higher than the first reference voltage, based on the reference current;

a first comparator, which has a first input terminal to which the first reference voltage is applied; and a charging/discharging circuit, which generates a third reference voltage in compliance with a charge/discharge controlling signal outputted from the first comparator and outputs the third reference voltage to a second input terminal of the first comparator, the third reference voltage indicating an average value of the first reference voltage, and the charge/discharge controlling signal being shifted alternately to two voltage levels, and the apparatus, further comprising a potential difference generating circuit, which monitors a power source voltage supplied to the current sensing circuit and the power window motor, and which clamps the third reference voltage so as to drop a constant voltage from the third reference when the power source is low, such that a potential difference between the second reference voltage and the third reference voltage is kept greater than a predetermined voltage.

2. The apparatus as set forth in claim 1, wherein the potential difference generating circuit includes:

a power source voltage monitoring circuit, which monitors the power source voltage to determine whether or not the power source voltage is low, and which outputs a clamp circuit control signal based on a result of a determination of the power source voltage monitoring circuit; and a clamping circuit, which is provided in the charge/discharge circuit for clamping the third reference voltage so as to drop the constant voltage from the third reference in accordance with the clamping circuit control signal indicating that the power source voltage is low.

* * * * *